(12) United States Patent
Kobayashi et al.

(10) Patent No.: US 9,055,160 B2
(45) Date of Patent: Jun. 9, 2015

(54) MOBILE PHONE

(75) Inventors: Hiroki Kobayashi, Daito (JP); Ryosuke Kawabata, Daito (JP)

(73) Assignee: Kyocera Corporation, Kyoto (JP)

( * ) Notice: Subject to any disclaimer, the term of this patent is extended or adjusted under 35 U.S.C. 154(b) by 247 days.

(21) Appl. No.: 13/218,356

(22) Filed: Aug. 25, 2011

(65) Prior Publication Data

US 2012/0052920 A1 Mar. 1, 2012

(30) Foreign Application Priority Data

Aug. 25, 2010 (JP) ................................. 2010-187983
Oct. 27, 2010 (JP) ................................. 2010-240364

(51) Int. Cl.
*H04B 1/38* (2006.01)
*G06F 3/041* (2006.01)
*H04M 1/725* (2006.01)
*H04M 1/57* (2006.01)

(52) U.S. Cl.
CPC ............ *H04M 1/72519* (2013.01); *H04M 1/57* (2013.01); *H04M 1/72552* (2013.01); *H04M 2250/22* (2013.01)

(58) Field of Classification Search
USPC ............... 340/7.55; 345/156–178; 455/414.1, 455/415, 417–419, 550.1, 556.1, 556.2, 455/566–569.1
See application file for complete search history.

(56) References Cited

U.S. PATENT DOCUMENTS

| 6,415,165 | B1 * | 7/2002 | Ishigami ........................ 455/566 |
| 2007/0150842 | A1 * | 6/2007 | Chaudhri et al. ............. 715/863 |
| 2008/0125184 | A1 | 5/2008 | Sano | |
| 2009/0160802 | A1 | 6/2009 | Yasumi | |
| 2009/0264117 | A1 * | 10/2009 | Hsieh et al. ................... 455/418 |
| 2010/0159995 | A1 * | 6/2010 | Stallings et al. ............. 455/566 |
| 2011/0181538 | A1 | 7/2011 | Aono | |

FOREIGN PATENT DOCUMENTS

| JP | 2001-339504 | | 12/2001 |
| JP | 2006-215915 | A | 8/2006 |
| JP | 2008-160482 | A | 7/2008 |
| JP | 2009-153072 | A | 7/2009 |
| JP | 2010-152737 | A | 7/2010 |
| JP | 2010-161757 | A | 7/2010 |
| WO | WO-2006/080068 | A1 | 8/2006 |

OTHER PUBLICATIONS

Office Action dated Mar. 4, 2014 from corresponding Japanese Patent Application No. 2010-240364 (Statement of Relevance included), 6 total pages.

* cited by examiner

*Primary Examiner* — San Htun
*Assistant Examiner* — Erica Navar
(74) *Attorney, Agent, or Firm* — Duane Morris LLP

(57) ABSTRACT

A mobile phone is disclosed. The mobile phone includes a touch panel, a correspondence execution determination part, and a correspondence selection part. The correspondence execution determination part determines whether or not to correspond with respect to an incoming call from other telephone, in response to an input from the touch panel. The correspondence selection part, when the correspondence execution determination part determines to correspond with respect to the incoming call from the other telephone, in response to the input from the touch panel, selects to at least answer the incoming call or ignore the incoming call.

15 Claims, 22 Drawing Sheets

Fig. 2
(A)
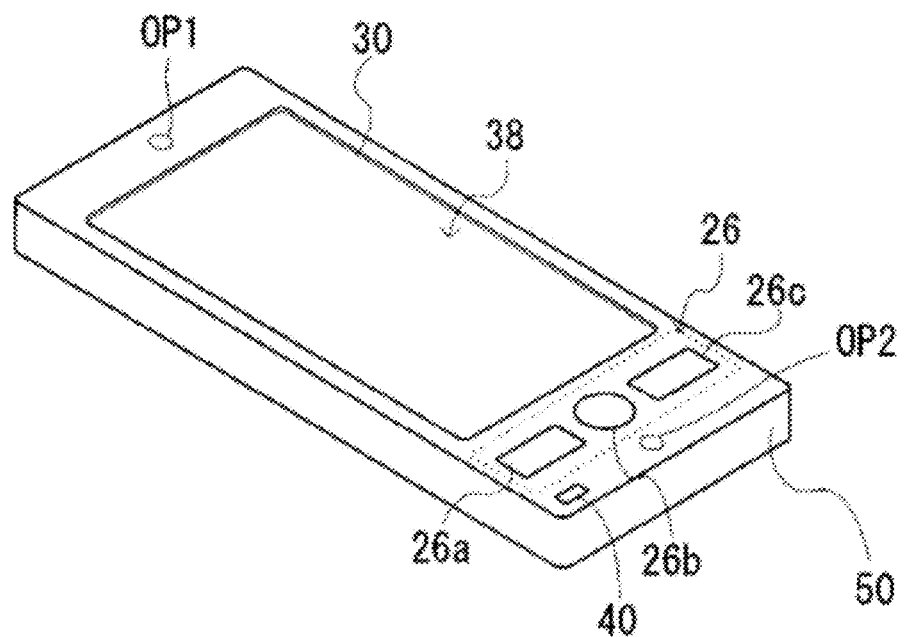
(B)
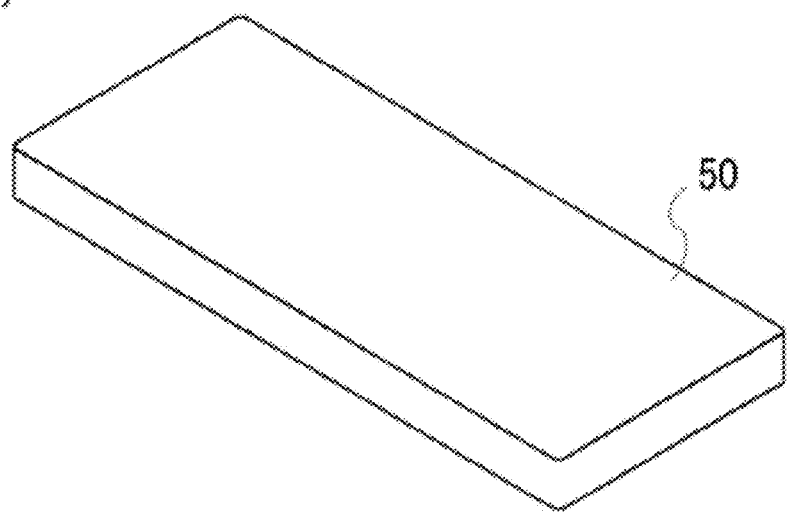

Fig. 3
(A) Incoming call screen 60
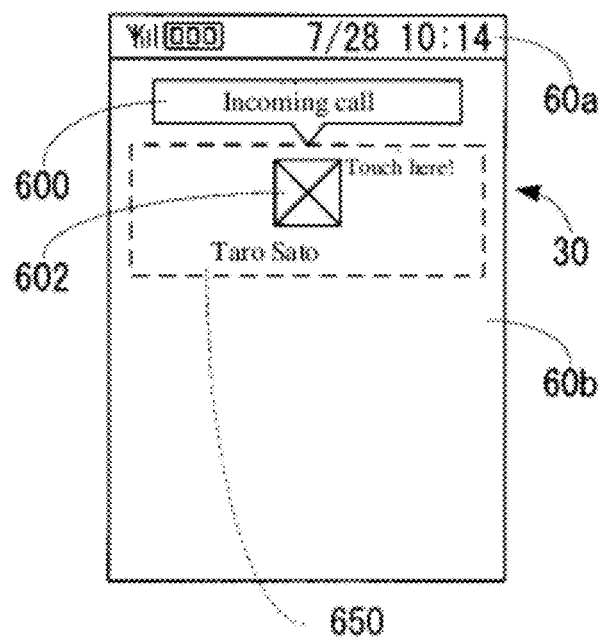
(B) Correspondence selection screen 70
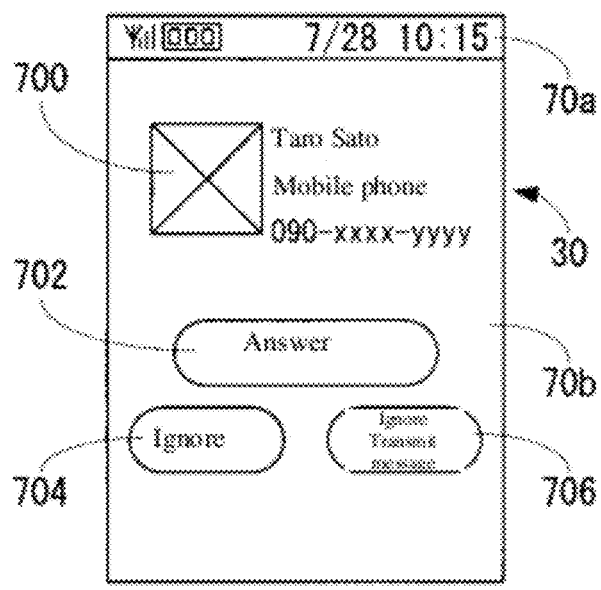

Fig. 4
(A) Screen during call 80
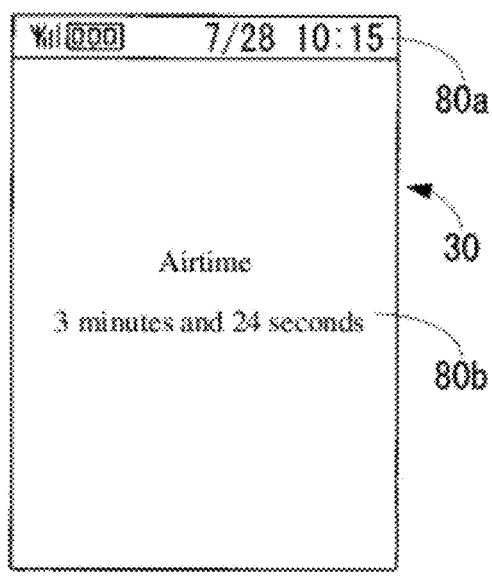
(B) Message composition screen 90
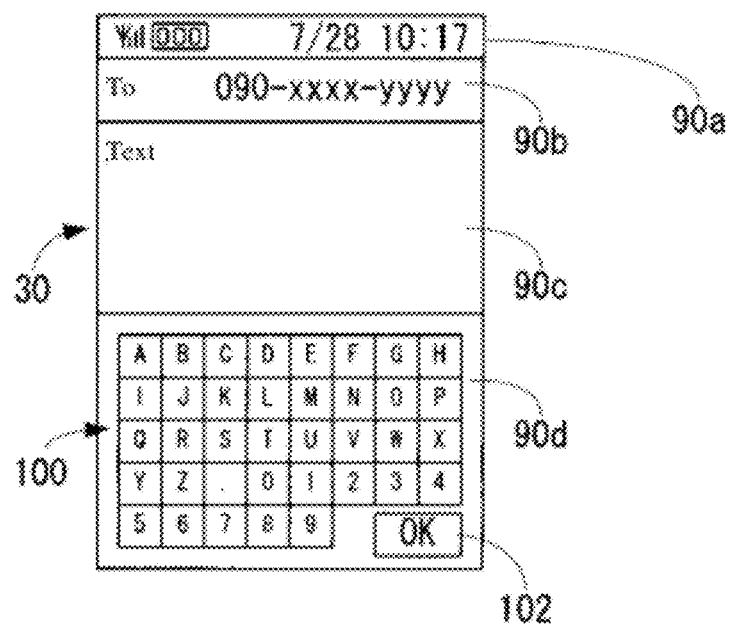

Fig. 11
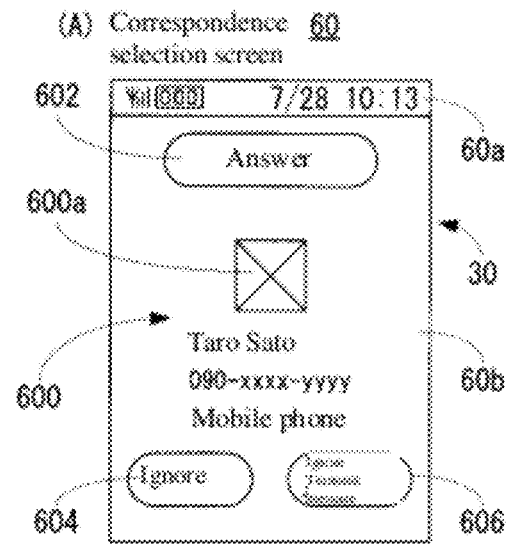
(A) Correspondence selection screen
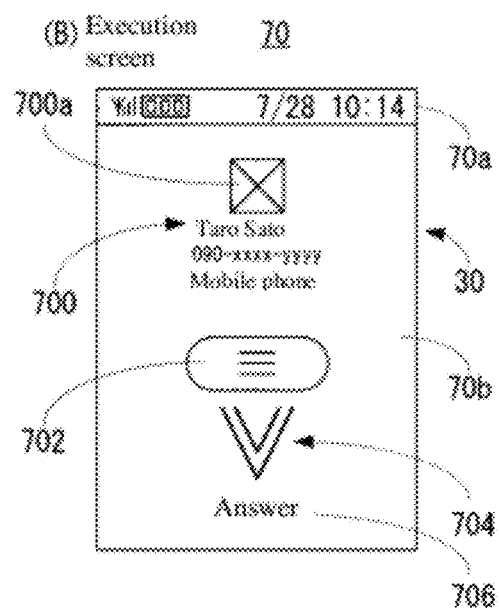
(B) Execution screen Fig. 12
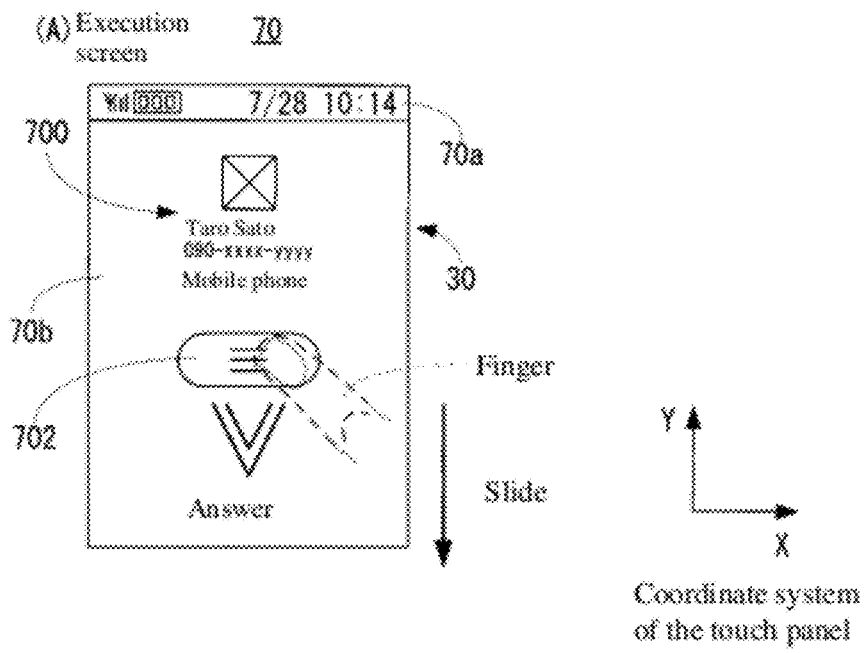
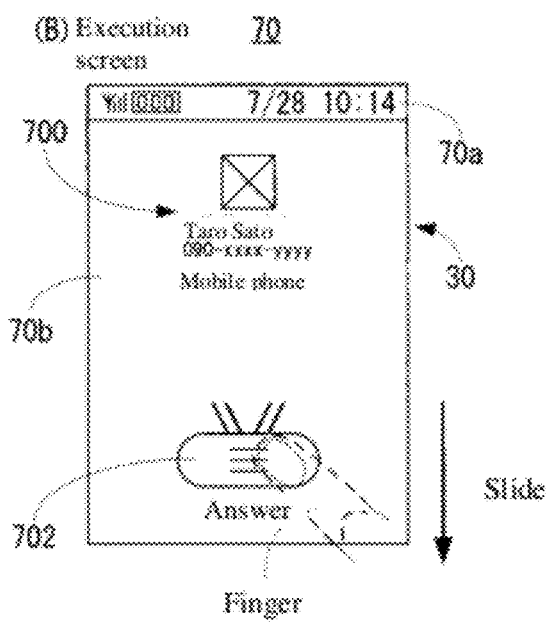

Fig. 13
(A) Screen during call  80
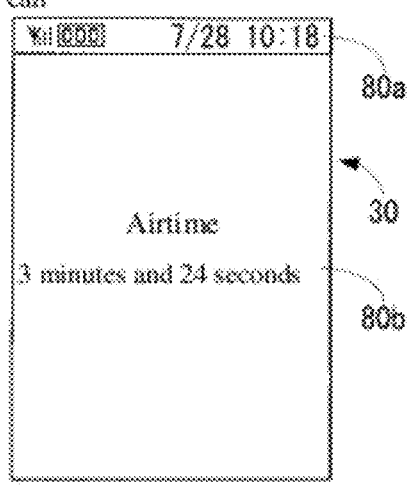
(B) Message composition screen  90
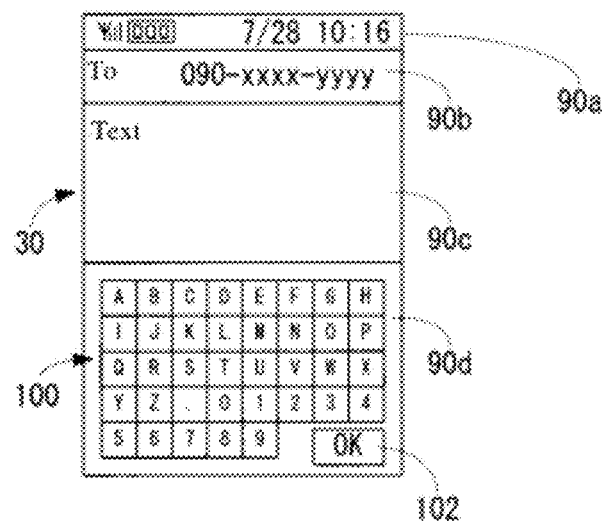

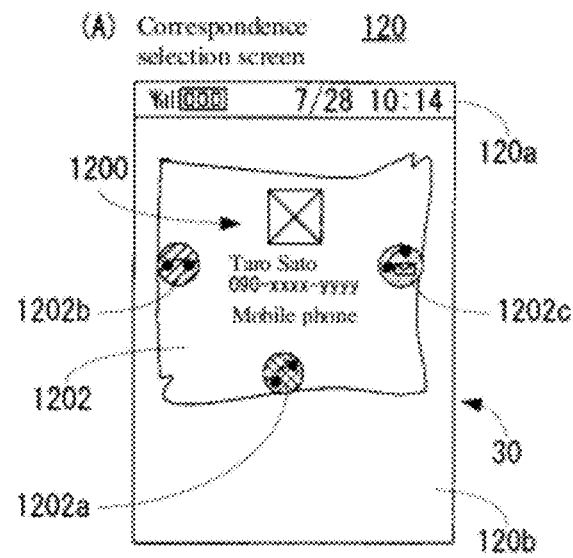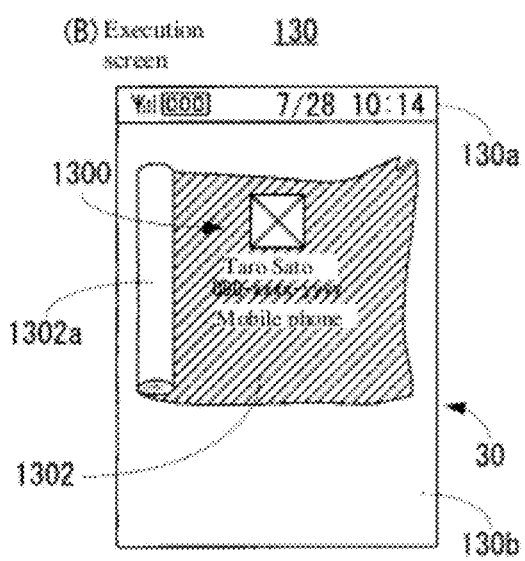

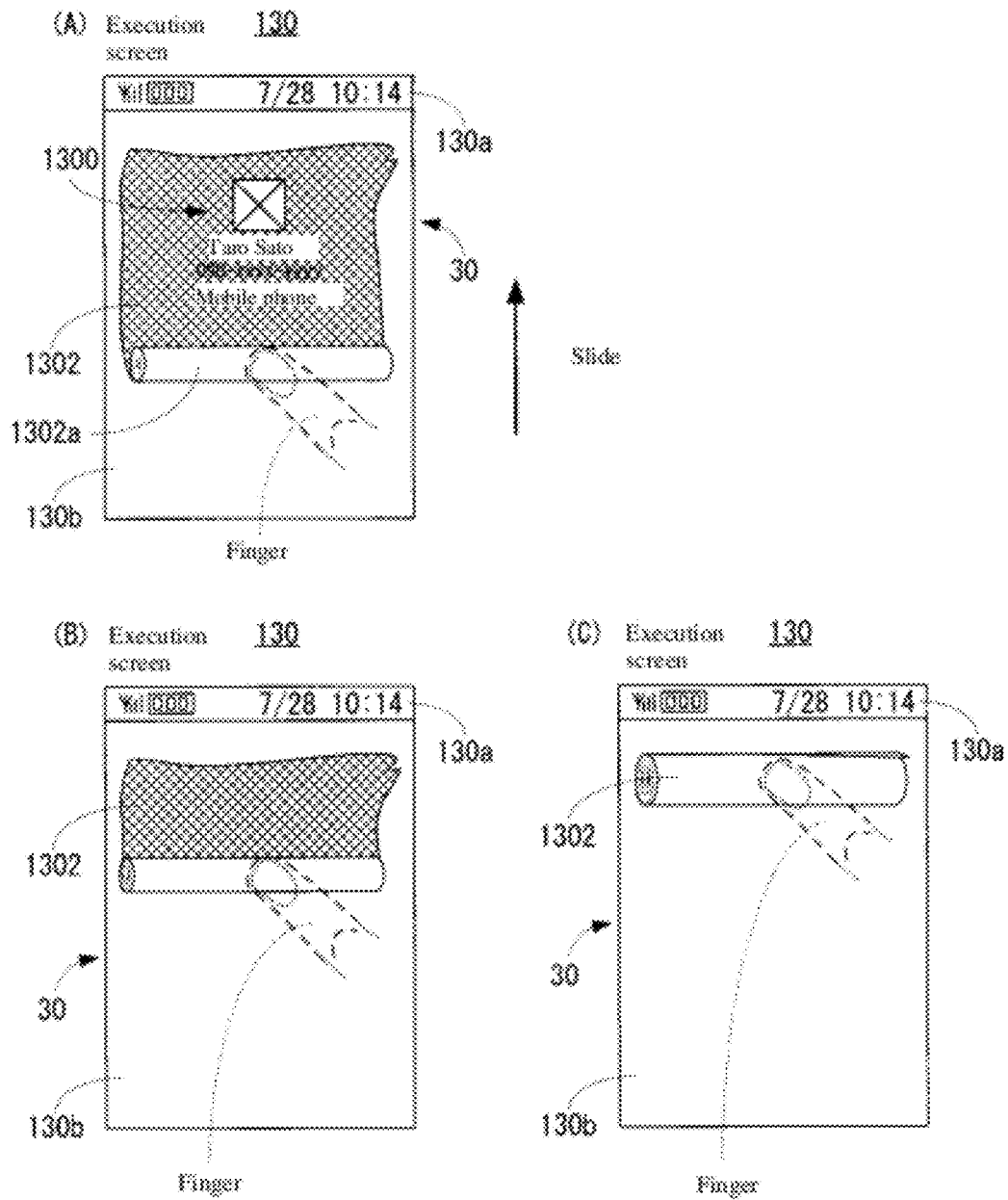

MOBILE PHONE

CROSS-REFERENCE TO RELATED APPLICATION

The present application claims priority under 35 U.S.C. §119 to Japanese Patent Application No. 2010-187983, filed on Aug. 25, 2010, entitled "Mobile Phone and Program for Mobile Phone" and Japanese Patent Application No. 2010-240364, filed on Oct. 27, 2010, entitled "Mobile Phone and Program for Mobile Phone". The content of which is incorporated by reference herein in its entirety.

FIELD

The present invention relates to a mobile phone, and particularly relates to, for example, a mobile phone comprising a touch panel.

BACKGROUND

One example of this type of mobile phone is disclosed. With this wireless communication device, when hands-free mode is selected and when it is in a hands-free mode standby state, for cases of answering incoming calls, if a touch panel comprised on the surface of a display part is pressed, it serves as an incoming correspondence and enters a drive mode communication state. However, with the wireless communication device according to prior art, if the touch panel is pressed when incoming calls are received, the incoming calls are answered immediately; consequently, it enters the drive mode communication state even for cases in which a user mistakenly presses the touch panel.

SUMMARY

In a first embodiment, a mobile phone comprises a touch panel, a correspondence execution determination part, and a correspondence selection part. The correspondence execution determination part determines whether or not to correspond with respect to an incoming call from other telephone, in response to an input from the touch panel. The correspondence selection part, when the correspondence execution determination part determines to correspond with respect to the incoming call from the other telephone, in response to the input from the touch panel, selects to at least answer the incoming call or ignore the incoming call.

In a second embodiment, a mobile phone comprising a touch panel, a correspondence execution determination part, and a correspondence selection part. The correspondence execution determination part determines whether or not to correspond with respect to an incoming call from other telephone, in response to an input from the touch panel. The correspondence selection part, when the correspondence execution determination part determines to correspond with respect to the incoming call from the other telephone, in response to the input from the touch panel, selects to at least answer the incoming call or ignore the incoming call and transmit a message to the other telephone.

In a third embodiment, a mobile phone comprises a touch panel, a correspondence selection part, and an execution part. The correspondence selection part selects a correspondence with respect to an incoming call from the other telephone, in response to an input from the touch panel. The execution part performs the correspondence selected by the correspondence selection part, in response to the input from the touch panel.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure. The drawings are not necessarily made to scale.

FIG. 2 is a diagram showing the external appearance of the mobile phone.

FIG. 3 is a diagram showing an example of the screen displayed on a display.

FIG. 4 is a diagram showing another example of the screen displayed on the display.

FIG. 11 is a diagram showing an example of a correspondence selection screen and an execution screen displayed on the display.

FIG. 12 is a diagram showing an example of an operation on the execution screen displayed on the display.

FIG. 13 is a diagram showing an example of a screen during calling and a message composition screen displayed on the display.

FIG. 21 is a diagram showing an example of the correspondence selection screen and the execution screen displayed on the display.

FIG. 22 is a diagram showing another example of the execution screen displayed on the display and the operation thereof.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure.

Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure are described herein in the context of one practical non-limiting application, namely, an information device. Embodiments of the disclosure, however, are not limited to such mobile information devices, and the techniques described herein may also be utilized in other applications. For example, embodiments may be applicable to mobile phones, digital books, digital cameras, electronic game machines, digital music players, personal digital assistance (PDA), personal handy phone system (PHS), lap top computers, and the like.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

Figure 1:
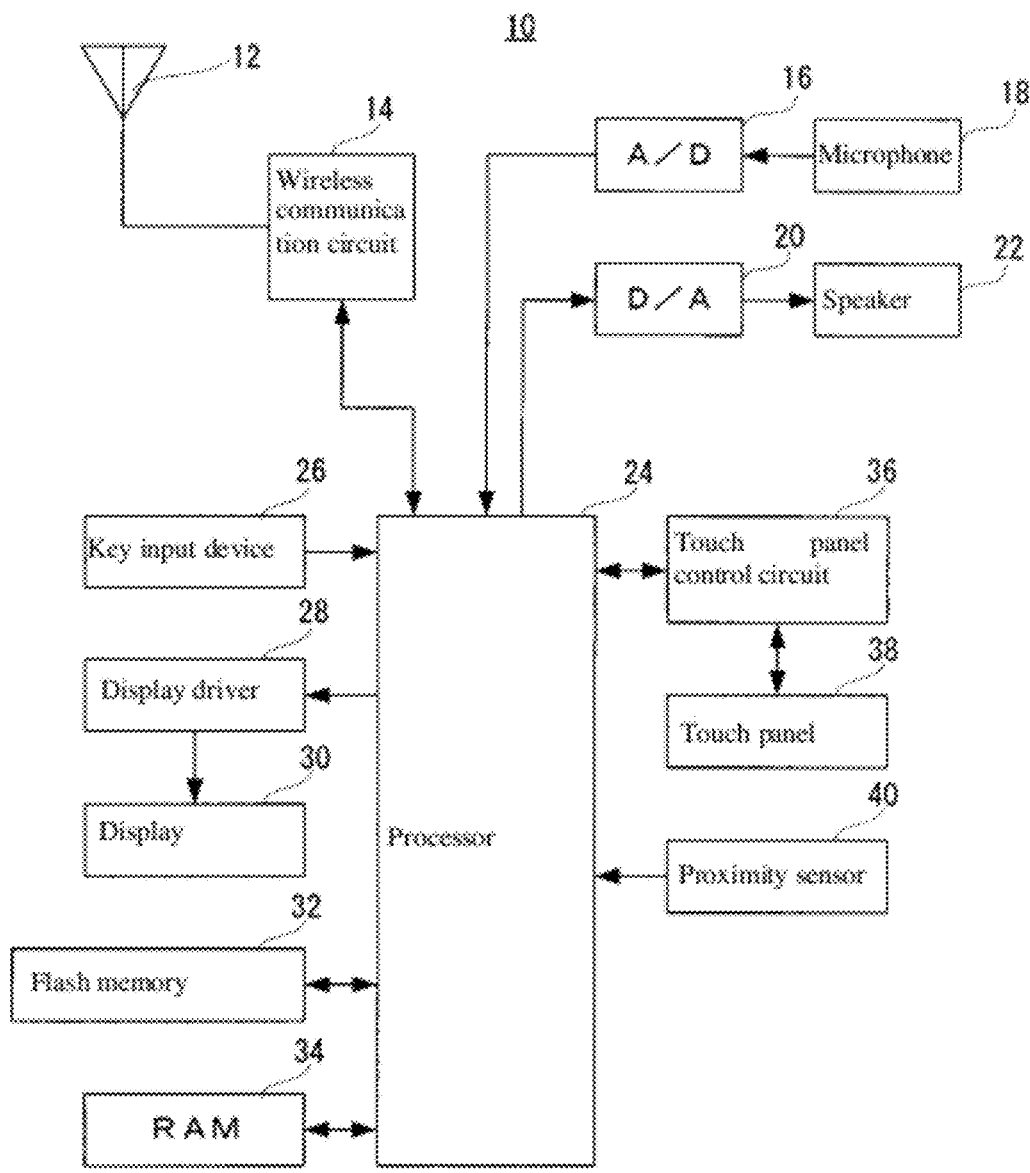
FIG. 1 is a block diagram showing the electrical configuration of a mobile phone according to one embodiment of the present invention.

As shown in FIG. 1, a mobile phone 10 according to the present embodiment is one type of mobile terminal, comprising a processor 24 referred to as a CPU or a computer. A wireless communication circuit 14, an A-D converter 16, a D-A converter 20, a key input device 26, a display driver 28, a flash memory 32, a RAM 34, a touch panel control circuit 36, and a proximity sensor 40 are connected to this processor 24. An antenna 12 is connected to the wireless communication circuit 14, a microphone 18 is connected to the A-D converter 16, and a speaker 22 is connected to the D-A converter 20 via an amplifier. A display 30 functioning as a display part is connected to the display driver 28. A touch panel 38 is also connected to the touch panel control circuit 36.

The processor 24 is a control IC and manages the overall control of the mobile phone 10. The RAM 34, which is referred to as a storage part, is used as a working area for the processor 24 (comprising a drawing region) or a buffer area. Content data such as characters, images, voices, sounds and videos of the mobile phone 10, or data such as user profiles and address books, is recorded in the flash memory 32.

The A-D converter 16 converts analog audio signals of sounds and voices input via the microphone 18 connected to the A-D converter 16 into digital audio signals. The D-A converter 20 converts (decodes) digital audio signals into analog audio signals and provides them to the speaker 22 via an amplifier. Consequently, sounds and voices corresponding to the analog audio signals are output from the speaker 22.

The key input device 26 comprises a talk key 26a, a function key 26b, an end key 26c, etc. (refer to FIG. 2 (A)). Information for the keys (key data) operated by a user is input into the processor 24. When each key comprised in the key input device 26 is operated, a click sound is generated. The user can obtain operational feeling for the key operation by listening for the click sound.

The display driver 28 controls the display of the display 30, which is connected to the display driver 28, based on a command from the processor 24. The display driver 28 also comprises a VRAM that temporarily stores display image data corresponding to the screen to be displayed on the display 30. The processor 24 stores the display image data in this VRAM.

The touch panel 38 is a pointing device for indicating arbitrary positions within the screen of the display 30. For example, the touch panel 38 according to the embodiment is a capacitive-type touch panel that detects changes in capacitance between electrodes caused when objects such as fingers approach the surface, detecting, for example, when one or a plurality of fingers touch the touch panel 38. That is, the touch panel 38 detects operations performed such as pressing, stroking, or touching the surface (the upper surface). Specifically, the touch panel control circuit 36 functioning as a touch detection part specifies the position of the finger when the finger touches the touch panel 38 and outputs data of the coordinates (coordinate data) indicating the operated position to the processor 24. That is, the user can input the position of an operation, the direction of the operation, figures, etc., into the mobile phone 10 by pressing, stroking, and touching the upper surface of the touch panel 38 with a finger.

Hereinafter, in the present embodiment, the operation in which a user touches the upper surface of the touch panel 38 is referred to as a "touch." In contrast, the operation in which a user releases the finger from the touch panel 38 is referred to as a "release." The operation in which a user strokes the upper surface of the touch panel 38 with the finger is referred to as a "slide." The coordinates indicated by the touch are referred to as the "touch point (touch start position)" and the coordinates indicated by the release are referred to as the "release point (touch end position)." The operation in which the user touches the upper surface of the touch panel 38 and then releases is referred to as a "touch and release." These operations, such as touch, release, slide, as well as touch and release, performed on the touch panel 38 are collectively referred to as "touch operations."

Note that touch operations may be performed not only with the fingers, but also with other objects such as a touch pen having a conductor attached at its tip. A detection system for the touch panel 38 may employ a surface-capacitance system or may be a resistance film system, an ultrasonic system, an infrared ray system, an electromagnetic induction system, etc.

The proximity sensor 40 comprises an infrared LED, which is a light-emitting element, and a photodiode, which is a light-receiving element. The processor 24 determines, from changes in the output of the photodiode, whether or not the proximity sensor 40 (the mobile phone 10) nears the face of the user. Specifically, the infrared LED emits infrared rays and the photodiode receives the infrared rays reflected by the face of the user, etc. That is, if the photodiode is located far away from the face of the user, the infrared rays emitted by the infrared LED are not received by the photodiode; however, as the proximity sensor 40 nears the face of the user, the infrared rays emitted by the infrared LED are received by the photodiode. In this way, with the photodiode, the amount of infrared rays received changes between cases in which the proximity sensor 40 nears the face of the user and cases in which this is not the case; consequently, the processor 24 detecting them can determine whether or not the proximity sensor 40 (the mobile phone 10) nears the face of the user, depending on the amount of infrared rays received.

Note that in the present embodiment, an infrared ray proximity sensor that utilizes infrared rays is used as the proximity sensor 40; however, a capacitive type proximity sensor that utilizes changes in the capacitance of a capacitor, as well as an ultrasonic proximity sensor that utilizes ultrasonic reflection, etc. may be used.

The wireless communication circuit 14 is a circuit for performing wireless communication in a CDMA system. For example, when a user instructs the key input device 26 to issue an audio transmission, the wireless communication circuit 14 performs audio transmission processing based on the command from the processor 24 and outputs the audio transmission signals via the antenna 12. The audio transmission signals are transmitted to a telephone of the intended party via a base station or a communications network. When incoming processing is performed at the telephone of the intended party, a communicable state (connection state) is established and the processor 24 performs call processing.

To describe normal call processing in more detail, modulated audio signals transmitted from the telephone of the intended party are received by the antenna 12. Demodulation processing and decoding processing are applied to the received modulated audio signals by the wireless communication circuit 14. The received audio signals obtained from this processing are converted into analog audio signals by the D-A converter 20 and are subsequently output from the speaker 22. In contrast, transmission audio signals retrieved via the microphone 18 are converted into digital audio signals by the A-D converter 16 and are subsequently provided to the processor 24. Based on a command from the processor 24, encoding processing and modulation processing are applied to the transmission audio signals converted to digital audio signals by the wireless communication circuit 14 and output via the antenna 12. Consequently, the modulated audio signals are transmitted to the telephone of the intended party via a base station and a communications network.

When the transmission signals from the telephone of the intended party are received by the antenna 12, that is, when there are incoming calls, the wireless communication circuit 14 notifies of incoming audio (may also be referred to as incoming calls). Accordingly, the processor 24 controls the display driver 28 to display the originator information recorded on incoming notification (name of the caller (intended party), etc.) on the display 30. At the same time, the processor 24 outputs a ringtone (may also be referred to as a ringtone or an incoming sound) via the speaker.

Note that if a vibrating device (vibrator) or an LED is provided on the mobile phone 10, incoming calls can be notified by vibration, emission of light (blinking), or both. This may be performed together with the above ringtone.

When the user selects (commands) to answer incoming calls, the wireless communication circuit 14 performs audio incoming processing based on the command from the processor 24, thus establishing a communicable state, and the processor 24 performs the abovementioned normal call processing.

As described subsequently, for correspondences with respect to incoming calls, since it is necessary to operate with two screens, operational errors can be prevented. For example, because the talk key 26a is provided on the surface of a housing 50, when the mobile phone 10 is stored inside a bag, it prevents any inconvenience from objects inside the bag inadvertently pressing the talk key 26a.

After reaching the communicable state, when the call end operation is performed with the end key 26c, the processor 24 controls the wireless communication circuit 14 and transmits call end signals to the intended party. After the call end signals are transmitted, the processor 24 ends call processing. Even if the call end signals are received from the intended party in advance, the processor 24 ends call processing. Regardless of the intended party, even if the call end signals are received from the mobile communications network, the processor 24 ends call processing.

The mobile phone 10 can perform a plurality of functions by establishing data communications with a server that is connected to the network. For example, the mobile phone 10 can perform an e-mail function that transmits and receives e-mails, or a browser function that acquires data published by the server, by establishing data communications with the mail server.

FIG. 2 (A) is an exterior diagram showing the external appearance of the surface of the mobile phone 10, and FIG. 2 (B) is an exterior diagram showing the external appearance of the rear surface of the mobile phone 10. As shown in FIG. 2 (A), the mobile phone 10 is formed in a straight shape and comprises planar rectangular shaped housing 50. The abovementioned microphone 18 is embedded in the housing 50. An opening OP2 leading to the built-in microphone 18 is longitudinally provided on the surface at one end of the housing 50. Similarly, the abovementioned speaker 22 is embedded in the housing 50. An opening OP1 leading to the built-in speaker 22 is longitudinally provided on the surface at the other end of the housing 50. The display 30 is attached such that the monitor screen is exposed from the housing 50. Although not shown in FIG. 2 (A), the abovementioned touch panel 38 is provided on the upper surface (front surface) of the display 30.

As shown in FIG. 2 (A), the key input device 26 comprises the talk key 26a, the function key 26b, and the end key 26c. These keys are comprised on the surface of the housing 50 and provided between the display 30 and the opening OP2.

As an example, the user inputs a telephone number by performing touch operations on the dial keys displayed on the display 30 and then performs an audio transmission operation using the talk key 26a. When the call ends, the user performs the call end operation using the end key 26c. Additionally, the user selects and determines the menu by performing touch operations on soft keys and a menu that are displayed on the display 30. The user turns the power of the mobile phone 10 ON/OFF by long-pressing the end key 26c.

Note that the antenna 12, the wireless communication circuit 14, the A-D converter 16, the D-A converter 20, the processor 24, the display driver 28, the flash memory 32, the RAM 34, and the touch panel control circuit 36 are embedded in the housing 50 and, therefore, omitted in FIG. 2 (A) and FIG. 2 (B).

An explanation is provided here regarding operations when incoming calls are received by the mobile phone 10 according to the present embodiment. When incoming calls are received from another telephone, an incoming call screen 60 as shown in FIG. 3 (A) is displayed on the display 30 the mobile phone 10. This incoming call screen 60 is used to select whether or not to answer the incoming calls from another telephone, by answering them. As shown in FIG. 3 (A), a display area 60a and a display area 60b are comprised on the incoming call screen 60.

The radio field intensity, battery level, date and time are displayed on the display area 60a (the same applies to display areas 70a, 80a, and 90a, which will be described subsequently). On the display area 60b, a message 600 showing the incoming call is displayed along with the originator information which is displayed underneath this message 600. The originator information displayed on this incoming call screen 60 is an image 602 registered with the caller and their name. The image 602 is a photograph of the face of the caller or an image registered in or downloaded to the mobile phone 10 in advance (character image). However, if an image is not registered for the caller, an image 602 of a card is displayed describing as such (no image). The name is a name or a nickname registered for the caller. A message indicating that this originator information (an operation area 650, which will be described subsequently) should be touched is also displayed on the display area 60*b*.

With respect to the area on which the originator information is displayed, an operation area 650 is set, shown as a dotted rectangular frame in FIG. 3 (A). However, this operation area 650 is not actually displayed on the incoming call screen 60. The detection range of a touch panel 38 is set (registered) with respect to the operation area 650). Specifically, a coordinate data group defining the detection range of the touch panel 38 corresponding to the operation area 650 displayed in the dotted rectangular frame, that is, coordinate data regarding all the coordinates inside the detection range is stored in the RAM 34 by being associated with this incoming call screen 60. However, since the detection range corresponding to the operation area 650 is rectangular, the coordinate data corresponding to the coordinates of the four vertices or the coordinates of the two diagonal vertices may be stored. If coordinates inside the detection range corresponding to the operation area 650 set in this way are detected, it is determined that the operation area 650 has been touched. In contrast, if coordinates outside the detection range corresponding to the operation area 650 are detected, it is determined that the area or the position, which is different from the operation area 650, has been touched.

Here, as can be seen from FIG. 3 (A), on the incoming call screen 60, the operation area 650 is set in some areas comprising the originator information within the entire operable range of the touch panel 38 (the same range as the entire display range of the display 30). This is intended to prevent processing based on the operation from being performed, in the case of an unintended operation by the user, such as mistakenly touching the operation area 650 when removing the mobile phone 10 from a bag or a case. Therefore, only the display area of the image 602 may be set in the operation area 650, in order to further decrease operational errors.

For the incoming call screen 60 as shown in FIG. (A), when the originator information is touched, that is, when the operation area 650 is touched, a correspondence selection screen 70 shown in FIG. 3 (B) is displayed on the display 30. As shown in FIG. 3 (B), the correspondence selection screen 70 comprises the display area 70*a* and the display area 70*b*. As described above, information such as the radio field intensity is displayed on the display area 70*a*.

The originator information of the caller, including an image 700, is displayed on the display area 70*b* simultaneously with a button image 702, a button image 704, and a button image 706. In addition to the image 700 and name of the caller, the type of terminal used by the caller (mobile or consumer electronics) and telephone number of the terminal are displayed on this correspondence selection screen 70 as originator information.

The button images 702 to 706 are displayed underneath the originator information. The button image 702 is provided in order to answer the incoming calls (accept). The button image 704 is provided in order to ignore the incoming calls. The button image 706 is provided in order to ignore the incoming calls while simultaneously transmitting a message to the caller (originator) of the incoming calls (ignore with text).

The operation area is set on the correspondence selection screen 70 shown in FIG. 3 (B), corresponding to the display areas of the button image 702 to the button image 706, respectively. As is the case with the above-mentioned operation area 650, the detection range of the touch panel 38 is set, corresponding to the button images 702 to 706, respectively. That is, the coordinate data group for each detection range is associated with the correspondence selection screen 70, and at the same time, the corresponding button images 702 to 706 are stored in the RAM 34 so as to be identifiable.

Therefore, when the coordinate data is input from the touch panel 38, it is determined whether or not this coordinate data is within the detection range corresponding to the operation area of the button images 702 to 706. If the coordinate data is within the detection range, the correspondence (function) is set (allocated) from the button image 702 to the button image 706 corresponding to the operation area in which the detection range is set. However, if the coordinate data is not input, or if the coordinate data is outside the entire detection range, the correspondence set in the button images 702 to 706 will not be performed.

A detailed explanation is omitted; however, as can be understood from FIG. 3 (A) and FIG. 3 (B), the operation area 650 set on the incoming call screen 60 as well as the button images 702 to 706 set on the correspondence selection screen 70 and the operation area are set in the display area of the display 30 at a position such that they do not overlap with one another. Consequently, when the incoming call screen 60 is displayed, even if the area or the position corresponding to the operation area 650 is mistakenly touched continuously, the button images 702 to 706 will not be touched on the response selection screen 70. That is, no correspondences will be unintentionally selected by the user with respect to the incoming call.

Regarding the response selection screen 70 shown in FIG. 3 (B), if it is determined that the button image 702 is touched, incoming calls (incoming calls) are answered, so that normal call processing is performed once the communicable state is established with the terminal (telephone) of the caller. At this time, a screen during call 80 as shown in FIG. 4 (A) will be displayed on the display 30. The screen during call 80, as shown in FIG. 4 (A), comprises the display area 80*a* and a display area 80*b*. The radio field intensity, etc. is displayed on the display area 80*a*, while the time from call start (call time) is displayed on the display area 80*b*.

When call processing is started, if the mobile phone 10 nears the face (ear) of the user and if this is detected by the processor 24 based on the amount of light received from the proximity sensor 40, the power of the display 30 is turned off. This is intended to reduce unnecessary power consumption. This is because the user does not see the display 30 while the user is engaged in conversation with the intended party during a call. Similarly, if the user is engaged in conversation with the intended party during a call, the user does not operate the touch panel 38; consequently, the power of the touch panel 38 is also turned off.

Note that if the proximity sensor 40 is not provided, call processing is started, and after a predefined time (for example, 3 to 15 seconds) elapses, the power of the display 30 or the touch panel 38 may be turned off. For example, the user can set the predefined time.

Regarding the correspondence selection screen 70 shown in FIG. 3 (B), if it is determined that the button image 704 is touched, ignoring the incoming call is selected. Accordingly, the mobile phone 10 disconnects the communication. That is, the telephone is disconnected without answering. Consequently, the output (play) of the ringtone is stopped. However, if it is set to silent mode and a vibrator is operated, the action (drive) is stopped. If the ringtone is output simultaneously with operation of the vibrator, both are stopped. Note that in order to indicate incoming calls by lighting or blinking of the illuminating device such as the LED, the illuminating device is turned off. Accordingly, if the mobile phone 10 disconnects communications, the telephone of the originator also disconnects communications in response. That is, transmission is stopped.

Regarding the correspondence selection screen 70 shown in FIG. 3 (B), if it is determined that the button image 706 is touched, incoming calls are ignored while simultaneously transmitting a message. The act of ignoring incoming calls is as described above; however, once communications of the mobile phone 10 are disconnected, a message composition screen 90 as shown in FIG. 4 (B) is displayed on the display 30. This message composition screen 90 comprises the display area 90*a*, a display area 90*b*, a display area 90*c*, and a display area 90*d*.

The radio field intensity, etc. is displayed on the display area 90*a* and the telephone number of the telephone of the caller is displayed on the display area 90*b* as the destination of the message. However, if the originator information is registered in the address book of the mobile phone 10, the name of the caller may be displayed. An input screen of the message is displayed on the display area 90*c*. Soft keys 100, etc. are displayed on the display area 90*d*. The soft keys 100 comprise, for example, button images for inputting alphabetical characters, symbols, and numeric characters. A button image 102 indicating message composition completion and message transmission is displayed.

The operation area is set, corresponding to the respective button images of the soft keys 100 and the display area of the button image 102, and the detection range of the touch panel 38 is set, corresponding to each operation area. Specifically, the coordinate data group defining the detection range of the touch panel 38 corresponding to the operation area of the respective button image is stored in the RAM 34, in association with this message composition screen 90. However, since the detection range corresponding to the button images is rectangular, the coordinate data of the coordinates of the four vertices or the two diagonal vertices may be stored. However, the coordinate data regarding the detection range of either button images is stored so as to be identifiable.

Therefore, if the user performs touch operations on the soft keys 100, corresponding characters (here, alphabetical characters, symbols, or numeric characters) are input (displayed) on the display area 90*c*. However, for cases of Roman character input, alphabetical characters are converted to Kana characters. When inputting in Japanese language (Kana characters), Hiragana characters are displayed on the soft keys 100.

If the user touches the button image 102, message composition is completed, and the composed message is simultaneously transmitted to the terminal of the destination displayed on the display area 90*b*, for example, with a short message service (SMS). However, if the mobile phone 10 comprises an e-mail function, the message may be transmitted to the telephone of the caller by e-mail. In such cases, an e-mail address set in the telephone is input to the destination and the composed message is set in the text of the e-mail.

Note that in the present embodiment, if ignoring the incoming call while simultaneously transmitting a message is selected on the correspondence selection screen 70, it is constituted such that after communication is disconnected, the message is immediately composed; however, one message may be selected and transmitted from one or a plurality of messages composed in advance. In such cases, a screen for selecting the message composed in advance may be displayed instead of the message composition screen 90.

If there is an incoming call (incoming call interrupt) from another telephone during a call, by moving the mobile phone 10 away from the face (ear) of the user, the power of the display 30 is turned on and the correspondence selection screen 70 is displayed on the front surface of the screen during call 80 of the intended party currently taking the call. Therefore, the user, as described above, can select to answer, ignore, or ignore while transmitting a message to the incoming call interrupt, by touching the button images 702, 704, and 706.

In this way, if there is an incoming call interrupt, by moving the mobile phone 10 away from the face of the user, the correspondence selection screen 70 is displayed on the display 30; hence, an action in which the user moves the mobile phone 10 away from the face corresponds to a corresponding selection command, for cases of incoming calls, which is not the incoming call interrupt (hereinafter may be referred to as a "normal incoming call"), as described above.

If the button image 702 is touched and answering the incoming call interrupt is selected, a communicable state and call processing is established with the caller of the incoming call interrupt. At this time, call processing with the previous caller performing call processing is suspended. When call processing with the caller of the incoming call interrupt is completed, previously suspended call processing is resumed.

If the button image 704 is touched and ignoring the incoming call interrupt is selected, a communicable state is established with the originator of the incoming call interrupt and voice-mail recording is started. When voice-mail recording is started, audio signals from the message indicating that the user is not able to take the call are transmitted to the originator of the incoming call interrupt, and subsequently, recording of the audio signals (received audio signals) from the message of the user of the telephone, which is the originator of the incoming call interrupt, is started. However, this voice-mail recording is performed in parallel with call processing of the previous intended party. When voice-mail recording is completed, the mobile phone 10 disconnects communications with the originator of the incoming call interrupt. For example, the mobile phone 10 detects that the voice-mail recording is completed as the telephone of the originator of the incoming call interrupt disconnects the communication and, as a result, it disconnects communication with the telephone of the originator of the incoming call interrupt.

Note that if, instead of the voice-mail recording, a telephone service provider provides a voice-mail telephone service, the message is recorded in the system operated and managed by the telephone service provider. In this case, if ignoring the incoming call interrupt is selected, the mobile phone 10 disconnects communication with the telephone of the originator of the incoming call interrupt and, subsequently, the telephone of the originator of the incoming call interrupt is connected to the system operated and managed by the telephone service provider, such that the user of the telephone of the originator can record a message.

If the button image 706 is touched and ignoring the incoming call interrupt while simultaneously transmitting a message is selected, as described above, the communicable state is established with the originator of the incoming call interrupt and voice-mail recording is started. Once voice-mail recording is completed, communication with the telephone of the originator of the incoming call interrupt is disconnected. The message composition screen 90 is displayed on the front surface of the screen during call 80 of the telephone currently taking a call. However, the telephone number of the telephone of the originator of the incoming call interrupt is input to the destination of the message composition screen 90. The composition and transmission of the message are as described above; therefore, a duplicated explanation is omitted.

Figure 5:
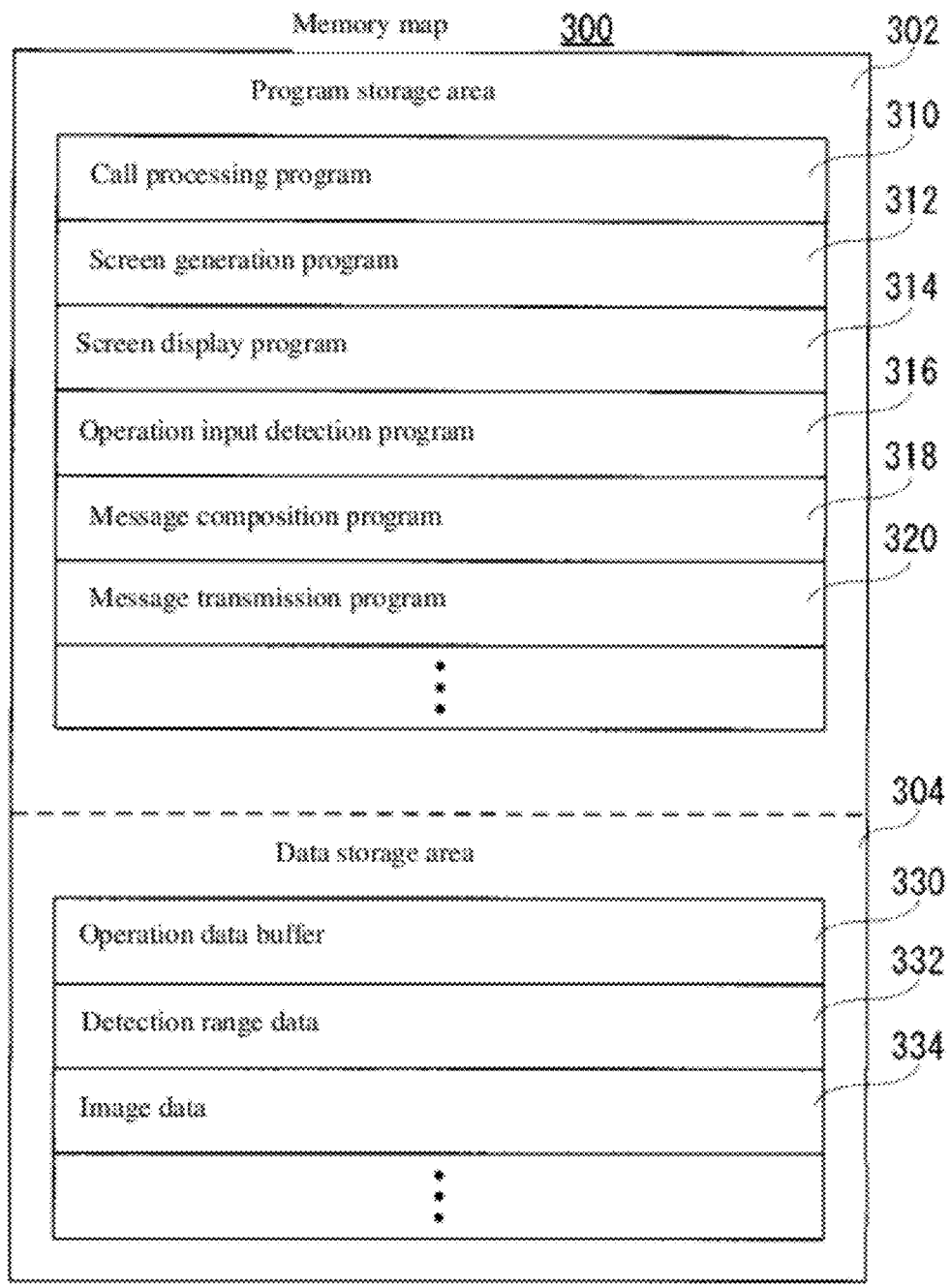
FIG. 5 is a diagram showing an example of a memory map of a RAM.

FIG. 5 is a schematic diagram showing a memory map 300 of the RAM 34 shown in FIG. 1. As shown in FIG. 5, the RAM 34 comprises a program storage area 302 and a data storage area 304. The program storage area 302 stores a control program for the mobile phone 10, and this program comprises a call processing program 310, a screen generation program 312, a screen display program 314, an operation input detection program 316, a message composition program 318, a message transmission program 320, etc.

The call processing program 310 is, as described above, a program for performing transmission processing, incoming processing, normal call processing, and interrupt processing. The screen generation program 312 is a program for generating display image data corresponding to the screen (60, 70, 80, 90, etc.) for displaying on the display 30 using image data 334, which is described subsequently. The screen display program 314 is a program for displaying the screen corresponding to the display image data generated on the display 30, in accordance with the screen generation program 312.

The operation input detection program 316 is a program for detecting key data input from the key input device 26 and coordinate data input from the touch panel 38 via the touch panel control circuit 36 as well as for storing (temporarily storing) in an operation data buffer 330, which is described subsequently. The message composition program 318 is a program for composing messages, in accordance with commands from the user, using the message composition screen 90. The message transmission program 320 is a program for transmitting the message composed, in accordance with the message composition program 318, to the telephone of the destination (originator), in accordance with commands from the user.

An audio output program for outputting (playing) the ringtone (melody) and music, and each program for performing various functions (e-mail, address book, calculator, schedule, etc.) are stored in the program storage area 302.

The operation data buffer 330 is comprised in the data storage area 304. Detection range data 332 and image data 334 are stored in the data storage area 304.

The operation data buffer 330 temporarily stores the key data input from the key input device 26 and the coordinate data input from the touch panel 38. The key data and the coordinate data, which are temporarily stored in the operation data buffer 330, are deleted (erased) once they are used for processing by the processor 24.

The detection range data 332 is, as described above, a coordinate data group of the detection range stored by associating with each screen, storing the corresponding operation area and the button image, so as to be identifiable.

The image data 334 is image data or data for character images, for a template for generating the display image data of each screen (70, 80, 90, etc.).

Audio data regarding the ringtone (melody and music), etc., is also stored. If commanded to read the profile or the address book, the corresponding data is loaded from the flash memory 32 to the RAM 34. The audio data from the message recorded by voice-mail recording is moved (saved) to the flash memory 32, after being temporarily stored in the RAM 34 (data storage area 304).

Figure 6:
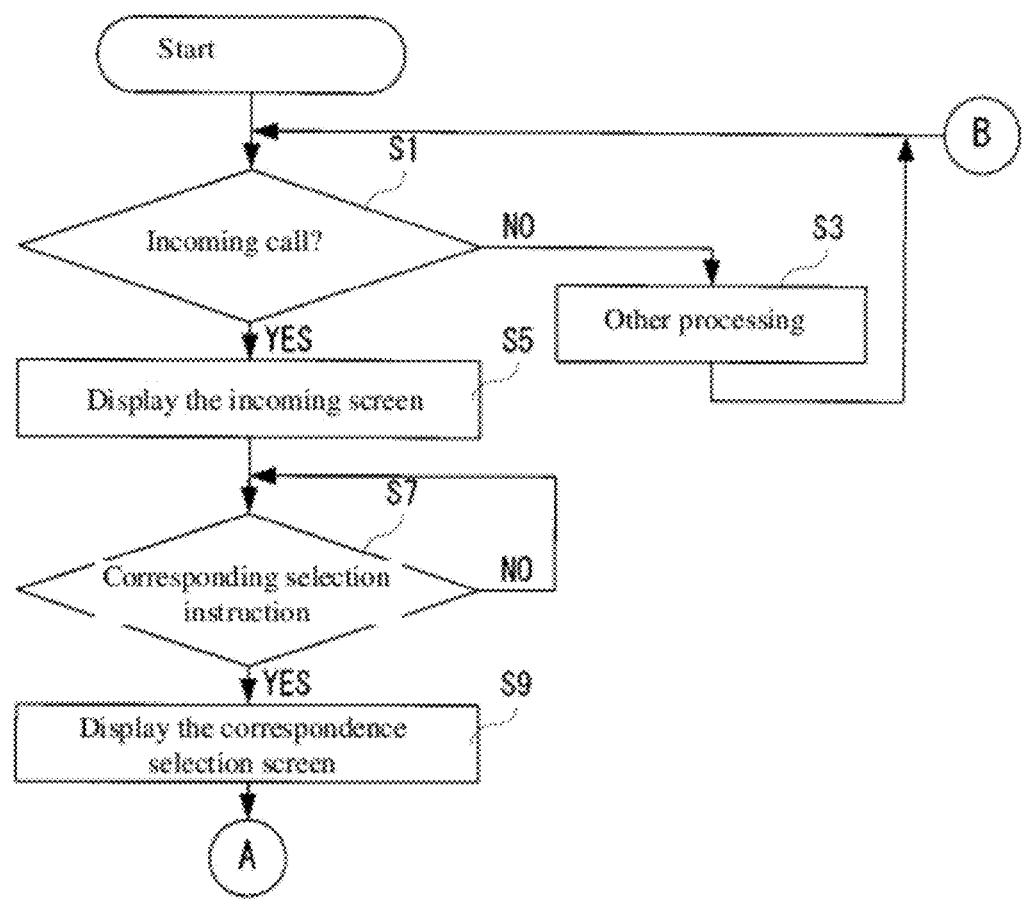
FIG. 6 is a flow diagram showing a part of the overall processing of a processor.
Figure 7:
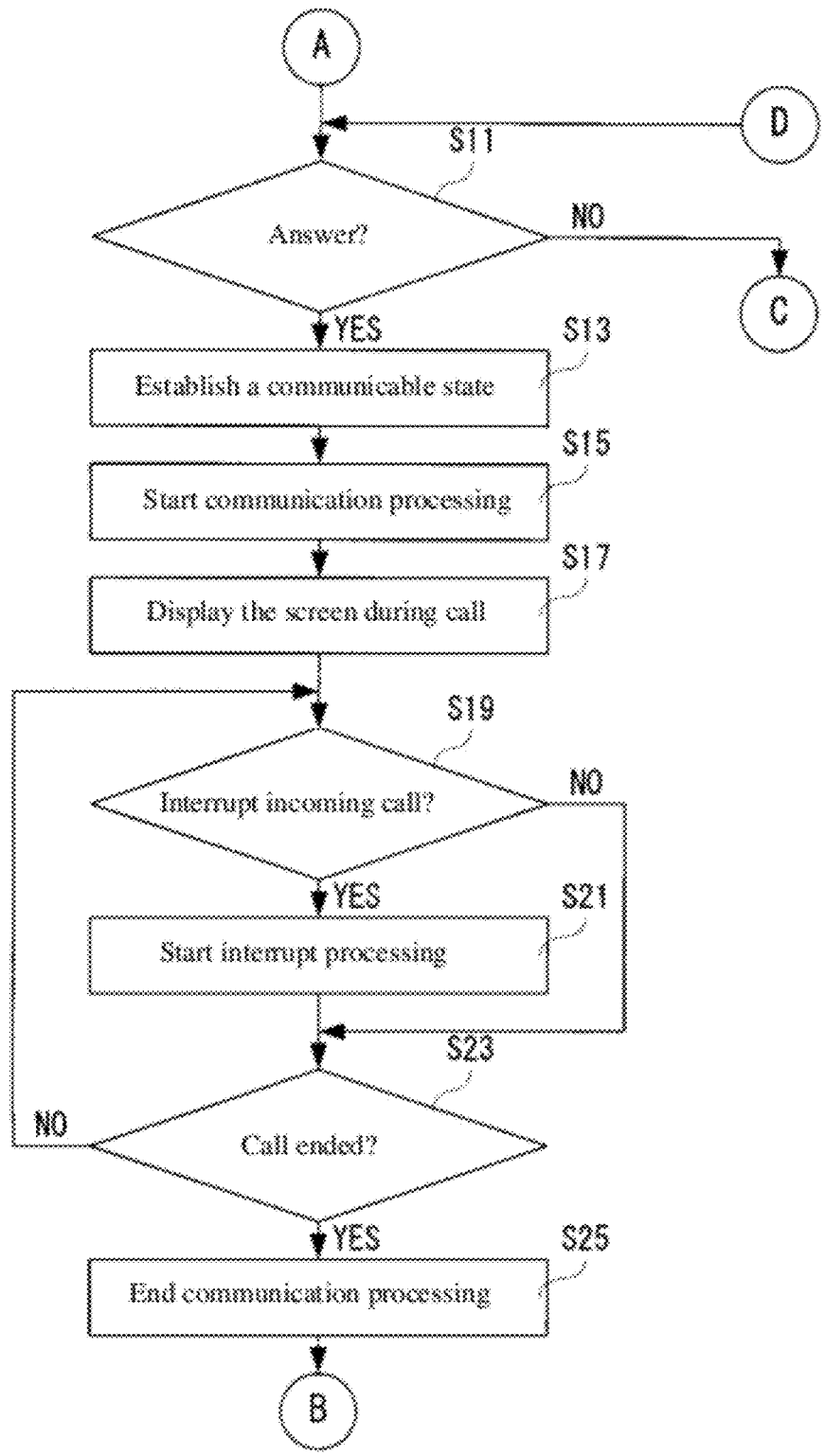
FIG. 7 is a flow diagram showing another part of the overall processing of the processor.
Figure 8:
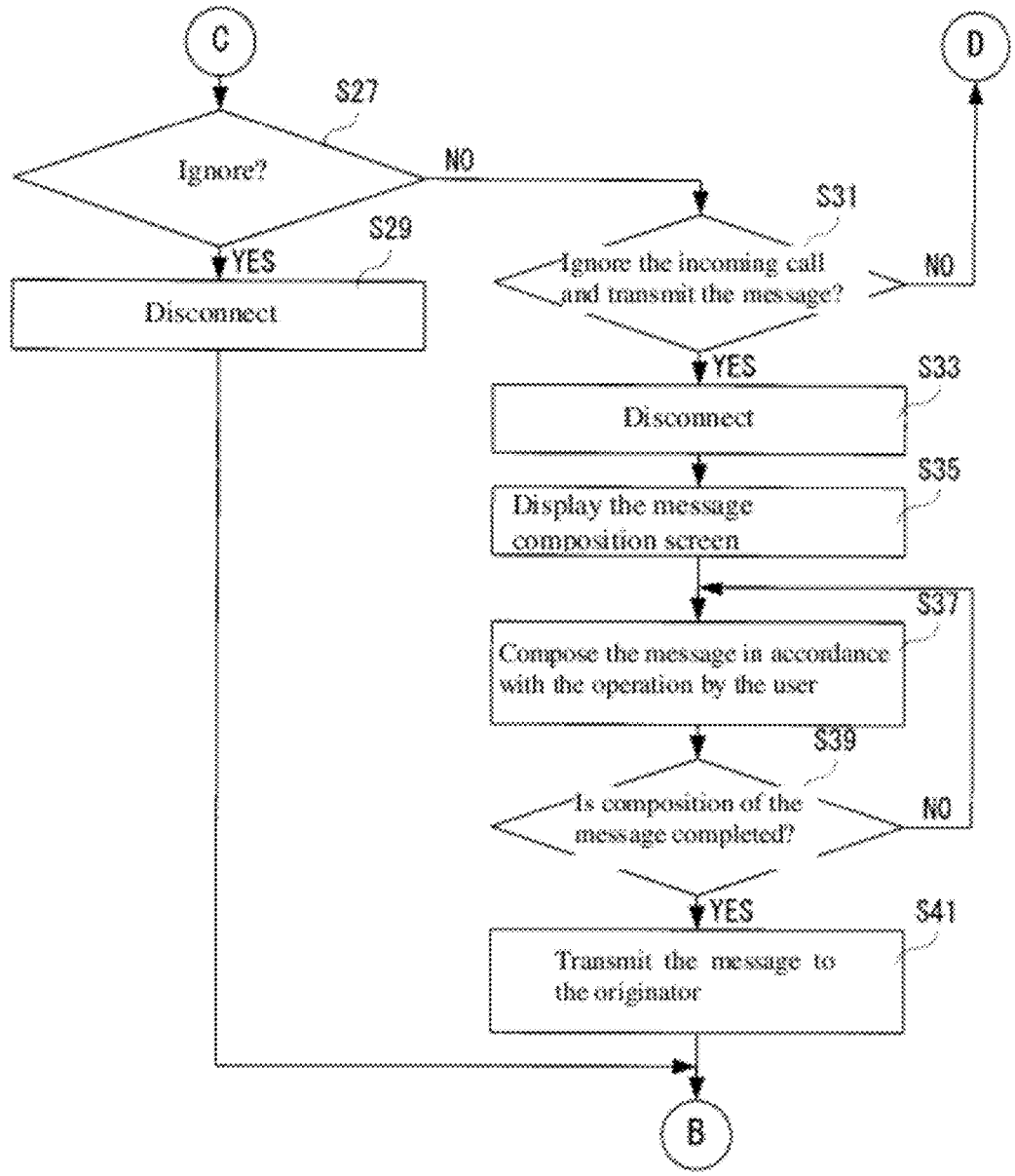
FIG. 8 is a flow diagram showing yet another part of the overall processing of the processor.

FIG. 6 to FIG. 8 are flow diagrams showing the overall processing of the processor 24. When the power of the mobile phone 10 is turned on, the processor 24 starts overall processing, and at Step S1, it determines whether or not there is an incoming call. That is, the processor 24 determines whether or not transmission signals are received from another telephone. If it is "NO" at Step S1, that is, if there is no incoming call, at Step S3, other processing is performed, and it returns to Step S1. Examples of other processing include: transmission processing, normal call processing resulting from transmission processing, interrupt processing in the middle of call processing (refer to FIG. 9 and FIG. 10), the respective processing of receiving, composing, and transmitting e-mails, the respective processing of registering and reading (referencing) the profile or address book, calculation processing of a calculator, the respective processing of displaying, inputting, and deleting a schedule, etc. However, processing other than interrupt processing, which is described subsequently, is already well-known, and is not essential in terms of the content of the present case; therefore, a detailed description is omitted.

On the other hand, if it is "YES" at Step S1, that is, if there is an incoming call, at Step S5, the incoming call screen 60 as shown in FIG. 3 (A) is displayed on the display 30. At this time, the processor 24 outputs the ringtone from the speaker 22, etc. At the subsequent Step S7, it is determined whether or not there is a corresponding selection command. That is, the processor 24 determines whether or not the coordinate data input from the touch panel 38 is within the detection range corresponding to the operation area 650, by referring to the detection range data 332.

If it is "NO" at Step S7, that is, if coordinate data is not input or if the coordinate data is outside the detection range corresponding to the operation area 650, it is determined that there is no corresponding selection command, and it returns to the same Step S7.

Note that in the present embodiment, if the operation area 650 is not touched, that is, when there is no corresponding selection command, it returns to Step S7 as is; however, it is not necessarily limited to this. That is, if no corresponding selection command is given for longer than a predefined time (for example, 30 seconds), and the same position, which is outside the range of the operation area 650 (corresponding detection range), is continuously touched for more than a predefined time (for example, 5 seconds), or if it is continuously touched a predefined number of times (for example, 3 times) in the area outside the range of the operation area 650, it may disconnect communications with the telephone of the originator, suspend the incoming call, or start voice-mail recording.

If it is "YES" at Step S7, that is, if the coordinate data is within the detection range corresponding to the operation area 650, it determines that there is a corresponding selection command, and at Step S9, it displays the correspondence selection screen 70, as shown in FIG. 3 (B), on the display 30. As shown in FIG. 7, at the subsequent Step S11, it determines whether or not to answer the incoming call. That is, the processor 24 determines whether or not the coordinate data is within the detection range corresponding to the operation area of the button image 702, by referring to the detection range data 332.

If it is "NO" at Step S11, that is, if the coordinate data is not input or if the coordinate data is outside the detection range corresponding to the operation area of the button image 702, it determines that answering the incoming call is not selected and proceeds to Step S27 shown in FIG. 8. On the other hand, if it is "YES" at Step S11, that is, if the coordinate data is within the detection range corresponding to the operation area of the button image 702, it determines that answering the incoming call is selected, and at Step S13, the communicable state (connection state) is established with the telephone of the originator. At Step S15, call processing is started, and at Step S17, the screen during call 80 as shown in FIG. 4 (A) is displayed on the display 30.

When call processing is started, if the processor 24 receives the received audio signals from the intended party, it outputs the received signals corresponding to these received audio signals from the speaker 22 and, in response, transmits a sound (call sound) of the user detected via the microphone 18 to the telephone of the intended party as transmission audio signals.

At the subsequent Step S19, it determines whether or not there is an incoming call interrupt. That is, the processor 24 determines whether or not there is an incoming call from another telephone, which is different from the telephone that is currently taking the call. If it is "NO" at Step S19, that is, if there is no incoming call interrupt, it proceeds to Step S23, as is. In contrast, if it is "YES" at Step S19, that is, if there is an incoming call interrupt, at Step S21, is starts interrupt processing (refer to FIG. 9 and FIG. 10), which is described subsequently, and proceeds to Step S23. However, interrupt processing is performed in parallel with the overall processing by the processor 24, by multi-tasking.

At Step S23, it determines whether or not the call ended. That is, the processor 24 receives call end signals from the intended party and determines whether or not the user pressed the end key 26c. If it is "NO" at Step S23, that is, if the call did not end, it returns to Step S19 and continues call processing. In contrast, if it is "YES" at Step S23, that is, if the call ended, at Step S25, it ends call processing and returns to Step S1. At Step S25, the processor 24 ends call processing, in response to the call end signals received from the intended party. At Step S25, the processor 24, in response to the end key 26c being pressed by the user, controls the wireless communication circuit 14, transmits call end signals to the intended party and, subsequently, ends call processing.

As above, if it is "NO" at Step S11 and proceeds to Step S27 shown in FIG. 8, it determines whether or not ignoring the incoming call is selected. That is, the processor 24 determines whether or not the coordinate data is within the detection range corresponding to the operation area of the button image 704, by referring to the detection range data 332. If it is "NO" at Step S27, that is, if the coordinate data is not input or if the coordinate data is outside the detection range corresponding to the operation area of the button image 704, it determines that the button image 704 is not touched and proceeds to Step S31.

If it is "YES" at Step S27, that is, if the coordinate data is within the detection range of the operation area of the button image 704, it determines that the button image 704 is touched, and at Step S29, it disconnects communications and returns to Step S1, as shown in FIG. 6. At this time, communications are disconnected at the telephone of the originator in response to the mobile phone 10 disconnecting communications.

At Step S31, it determines whether or not ignoring the incoming call is selected and simultaneously transmits a message. That is, the processor 24 determines whether or not the coordinate data is within the detection range corresponding to the operation area of the button image 706, by referring to the detection coordinate data 332. If it is "NO" at Step S31, that is, if the coordinate data is not input or if the coordinate data is outside the range of the operation area of the button image 706, it determines that the button image 706 is not touched and returns to Step S11, shown in FIG. 7.

Note that in the present embodiment, if none of the button images 702 to 706 is touched, that is, if no selection is made for correspondence, such that it waits for selections to be made for correspondence, it returns to Step S11; however, it is not limited to this. For example, if no selections are made for correspondence for a predefined time (for example, 30 seconds), if the same position outside the range of the display area of the button images 702 to 706 is continuously touched for more than a predefined time (for example, 5 seconds), or if the area outside the range of the display are of the button images 702 to 706 (the detection range corresponding to the operation area) is continuously touched more than a predefined number of times (for example, 3 times), communications with the telephone of the originator may be disconnected, the incoming call may be suspended, or voice-mail recording may be started. The same applies to cases in which the presence of selections for correspondence is detected for interrupt processing, which is described subsequently.

In contrast, if it is "YES" at Step S31, that is, if the coordinate data is within the detection range of the operation area of the button image 706, it is determined that the button image 706 is touched, and at Step S33, communications are disconnected. At Step S35, the message composition screen 90, as shown in FIG. 4 (B), is displayed on the display 30.

At the subsequent Step S37, a message is composed in accordance with the operation by the user. That is, on the display area 90c of the text, characters in accordance with the operation of the soft keys 100, etc., are input (displayed). However, the processor 24, referring to the detection range data 332, using the soft keys 100, inputs alphabetical characters, symbols, or numeric characters that the keys (the button image) display on the display area, on which the operation area corresponding to the detection range comprising the coordinate data is set.

At the subsequent Step S39, it determines whether or not message composition is completed. That is, by referring to the detection range data 332, the processor 24 determines whether or not the coordinate data is within the detection range corresponding to the operation area of the button image 102. If it is "NO" at Step S39, that is, if the coordinate data is within the detection range of the operation area of the button image 102, it determines that message composition is completed, returns to Step S37, and continues composing the message. In contrast, if it is "YES" at Step S39, that is, if the coordinate data is within the detection range corresponding to the operation area of the button image 102, it determines that message composition is completed, and at Step S41, transmits the composed message to the originator before returning to Step S10

Figure 9:
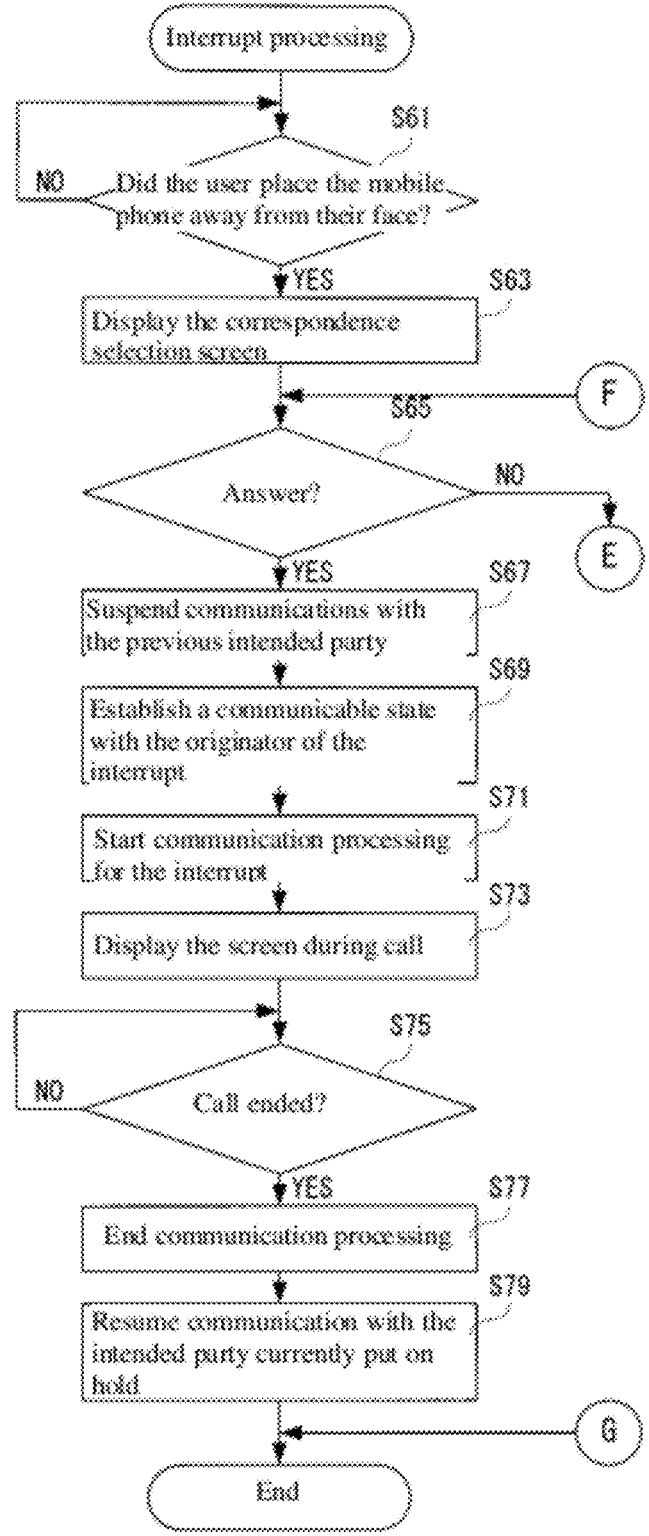
FIG. 9 is a flow diagram showing a part of the interrupt processing of the processor.
Figure 10:
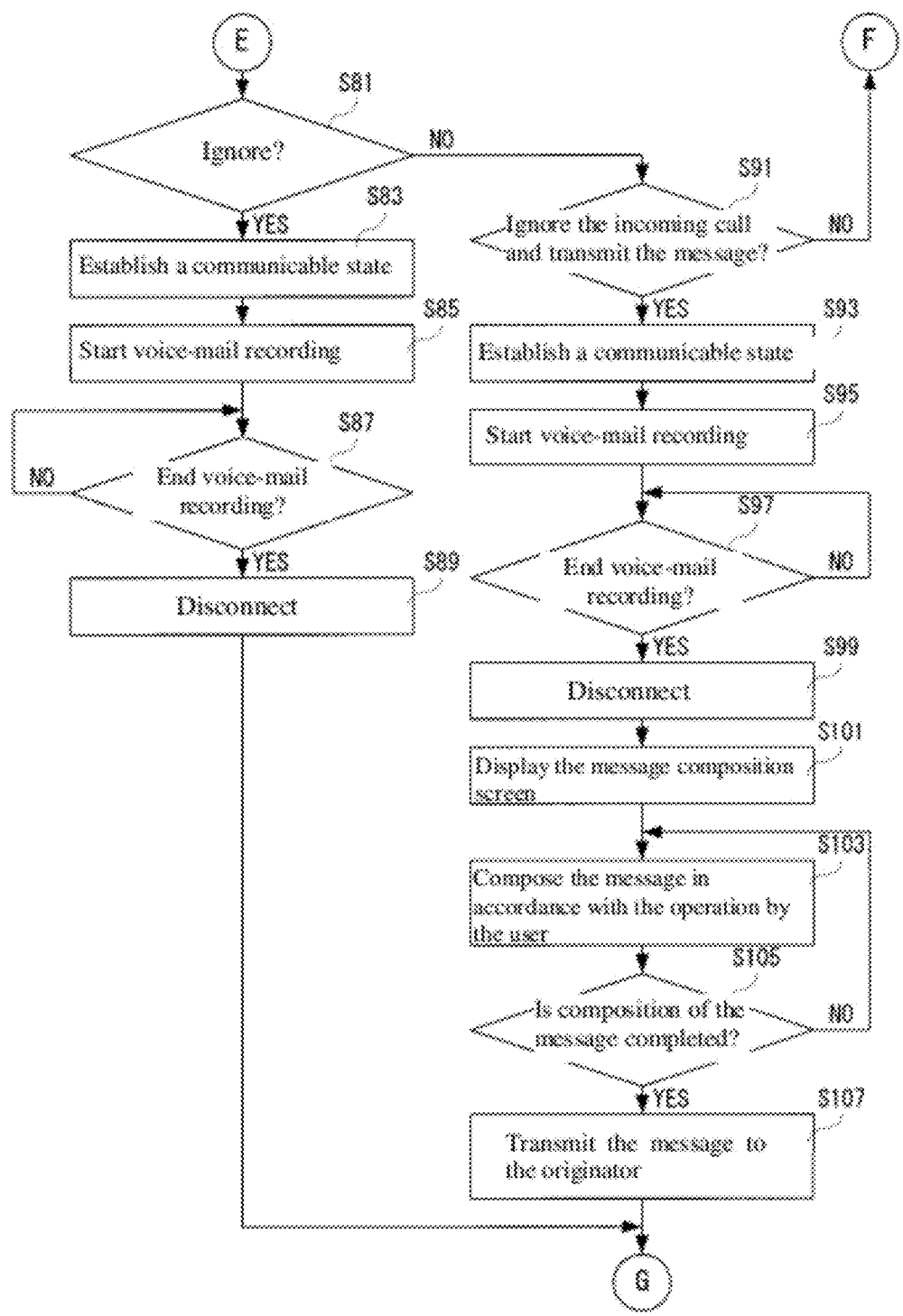
FIG. 10 is a flow diagram showing another part of the interrupt processing of the processor.

FIG. 9 and FIG. 10 are flow diagrams showing interrupt processing of the processor 24. This interrupt processing is described below; however, the same processing as the processing for the overall processing as described above is briefly described.

As shown in FIG. 9, after the processor 24 starts interrupt processing, at Step S61, it determines whether or not the user moved the mobile phone 10 away from their face. As above, the processor 24, according to the amount of received infrared rays detected at the proximity sensor 40, determines whether or not this proximity sensor 40 (the mobile phone 10) is nearing the face of the user. If it is "NO" at Step S61, that is, if the user is not moving the mobile phone 10 away from their face, it returns to Step S61, as is.

Note that in the present embodiment, if the user is not moving the mobile phone 10 away from their face, it returns to Step S61, as is; however, if this state continues for more than a predefined time (for example, 5 to 10 seconds), it may disconnect communications with the incoming call interrupt or it may disconnect communications after voice-mail recording is performed.

In contrast, if it is "YES" at Step S61, that is, if the user moves the mobile phone 10 away from their face, it determines that it is the corresponding selection command for the incoming call interrupt, and at Step S63, the correspondence selection screen 70, as shown in FIG. 3 (B), is displayed on the display 30. At this time, the correspondence selection screen 70 is displayed on the front surface of the screen during call 80 of the intended party currently taking the call.

Note that if it is "YES" at Step S61, once the power of the display 30 and the touch panel 38 are turned on, processing of Step S63 is performed.

At the subsequent Step S65, it determines whether or not answering the incoming call interrupt is selected. That is, the processor 24 determines whether or not the button image 702 has been touched. If it is "NO" at Step S65, that is, if the button image 702 is not touched, it determines that answering the incoming call interrupt is not selected and proceeds to Step S81 shown in FIG. 10.

In contrast, if it is "YES" at Step S65, that is, if the button image 702 is touched, it determines that answering the incoming call interrupt is selected, at Step S67, it suspends the call with the previous intended party, at Step S69, it establishes a communicable state with the telephone of the originator of the incoming call interrupt, and at Step S71, it starts call processing for interrupt. However, if the call with the previous intended party is suspended for overall processing, it reaches a state in which the processing of Step S23 is stopped (temporarily stopped).

At the subsequent Step S73, the screen during call 70 regarding call processing for the interrupt is displayed on the display 30. At Step S75, it determines whether or not the call ended. If it is "NO" at Step S75, it returns to the same Step S75. If it is "YES" at Step S75, at Step S77, it ends call processing for the incoming call interrupt. At Step S79, it resumes call processing with the telephone of the intended party currently put on hold and ends interrupt processing. That is, at Step S79, the execution of the processing of Step S23 that is currently stopped (temporarily stopped) is resumed.

As above, if it is "NO" at Step S65 and proceeds to Step S81 shown in FIG. 10, it determines whether or not ignoring the incoming call interrupt is selected. That is, the processor 24 determines whether or not the button image 704 is touched. If it is "NO" at Step S81, that is, if the button image 704 is not touched, it determines that ignoring the incoming call interrupt is not selected and proceeds to Step S91.

In contrast, if it is "YES" at Step S81, that is, if the button image 704 is touched, it determines that ignoring the incoming call interrupt is selected, and at Step S83, it establishes a communicable state (connection state) with the telephone of the originator of the incoming call interrupt, and at Step S85, it starts voice-mail recording. Here, the processor 24 transmits the audio signals regarding the message indicating that the call cannot be answered to the originator of the incoming call interrupt, and starts recording the received audio signals from the user of the telephone, which is the originator of the incoming call interrupt. The received audio signals for recording are temporarily stored in the RAM 34.

At the subsequent Step S87, it determines whether or not to end voice-mail recording. That is, the processor 24 determines whether or not the telephone of the originator of the incoming call interrupt disconnected the communications. If it is "NO" at Step S87, that is, if voice-mail recording is not completed, it returns to the same Step S87, and continues voice-mail recording. In contrast, if it is "YES" at Step S87, that is, if voice-mail recording is not completed, at Step S89, it disconnects the communication, and as shown in FIG. 9, it ends interrupt processing. When the voice-mail recording is completed, the received audio signals (the audio signals of the message) temporarily stored in the RAM 34 are stored in the flash memory 32.

At Step S91, it determines whether or not ignoring the incoming call interrupt while simultaneously transmitting a message is selected. That is, the processor 24 determines whether or not the button image 706 is touched. If it is "NO" at Step S91, that is, if the button image 706 is not touched, it determines that ignoring the incoming call interrupt while simultaneously transmitting a message is not selected before returning to Step S65, shown in FIG. 9.

In contrast, if it is "YES" at Step S91, that is, if the button image 706 is touched, it determines that ignoring the incoming call interrupt while simultaneously transmitting a message is selected, and at Step S93, it establishes the communicable state with the telephone of the originator of the incoming call interrupt, and at Step S95, it starts voice-mail recording. At Step S97, it determines whether or not to end voice-mail recording.

If it is "NO" at Step S97, it returns to the same Step S97 and continues voice-mail recording. In contrast, if it is "YES" at Step S97, at Step S99, it disconnects communications with the originator of the incoming call interrupt, and at Step S101, the message composition screen 90, as shown in FIG. 4 (B), is displayed on the display 30.

At the subsequent Step S103, a message is composed in accordance with the operation of the user. At Step S105, it determines whether or not to end message composition. That is, the processor 24 determines whether or not the button image 102 is touched. If it is "NO" at Step S105, it returns to Step S103 and continues composing the message. In contrast, if it is "YES" at Step S105, at Step S107, it transmits the composed message to the originator and ends interrupt processing.

According to the present embodiment, if the corresponding selection command is provided on the incoming call screen, correspondence with the incoming call is selected by displaying the correspondence selection screen; consequently, compared to cases in which correspondence with the incoming call is selected with one touch, operational errors can be prevented.

In the present embodiment, with the incoming call screen, if a slide that is equal to or more than the designated distance is not conducted as to move the object image, the correspondence selected at correspondence selection screen will not be conducted; consequently, when the mobile phone is removed from a bag or a case, the correspondence selection screen is prevented from being displayed, at a somewhat high percentage.

In the present embodiment, since the operation area set on the incoming call screen and the operation area of the button image on the correspondence selection screen do not overlap, even if the operation area set on the incoming call screen is mistakenly pressed, for example, for cases in which it reaches a state in which the operation area set on the incoming call screen is continuously pressed, because the touch panel reacts inside the bag with the correspondence selection screen, no correspondences are selected.

Note that in the present embodiment, it was constituted so as to select to answer, ignore, and ignore while simultaneously transmitting a message, with respect to the incoming call; however, it may be constituted such that it is not possible to select ignore, or ignore while simultaneously transmitting a message (not available). That is, it may be constituted such that in response to the incoming call, it is possible to select answer or ignore, or it is possible to answer or ignore while simultaneously transmitting a message.

In the present embodiment, the message "Touch here!" showing the operation method, as shown in FIG. 3 (A), and the content of the correspondence (answer, ignore, ignore and transmit message), shown in FIG. 3 (B), are displayed in Japanese; however, they are not limited to this. For example, they may be displayed in other languages such as English, French, German, Russian, Korean, and Chinese. The same applies to other displays, shown in FIG. 3 (A), FIG. 3 (B), FIG. 4 (A), and FIG. 4 (B).

In the present embodiment, as shown in FIG. 3 (A), the message indicating the operation method is indicated as a character string; however, it may display an image by which the user can understand that it is touched (for example, an image in which the screen is touched with the finger). In such cases, even if the operation method is not indicated in a language that the user understands, the user is able to understand the operation method from the image.

The present embodiment is constituted such that if the correspondence selection screen, shown in FIG. 3 (B), is displayed, by touching any of the button images 702 to 706, the content of the correspondence is selected; however, it may be constituted such that it is selected using the key input device 26. For example, if the talk key 26a is turned on, answering the incoming call is selected, if the end key 26c is turned on, ignoring the incoming call is selected, and if the function key 26b is turned on, ignoring the incoming call while simultaneously transmitting a message is selected.

In the present embodiment, the CDMA method was used as the communication method; however, it is not limited to this, and other methods such as the LTE (Long Term Evolution) method, the W-CDMA method, the GSM method, the TDMA method, FDMA method, and the PHS method may also be used.

In the present embodiment, an explanation was provided for cases in which interrupt processing is performed when answering the incoming call is selected and call processing is performed; however, even for cases in which call processing is performed with another telephone in response to the transmission, the same interrupt processing is performed.

Any specific numerical values, such as the predefined time or predefined number of times, as mentioned above, are listed herein as mere examples but are appropriately changeable according to the specifications of a product, etc.

For example, the layout of the soft keys 100 displayed on the display area 90d of the message composition screen, shown in FIG. 4 (B), may be in the QWERTY layout.

Hereinafter, in the present embodiment, the operation in which the user touches the upper surface of the touch panel 38 with the finger is referred to as a "touch." In contrast, the operation in which the user releases the finger from the touch panel 38 is referred to as a "release." The operation in which the user strokes the upper surface of the touch panel 38 with the finger is referred to as a "slide." However, the operation in which the user moves (slides) the finger more than a predefined distance (for example, 50 pixels) within a predefined time (for example, 50 ms) and releases the finger, while touching the finger on the upper surface of the touch panel 38 is referred to as a "hook." The coordinates indicated by the touch are referred to as a "touch point (touch start position)" and the coordinates indicated by the release are referred to as a "release point (touch end position)." The operation in which the user touches the upper surface of the touch panel 38 and then releases is referred to as a "touch and release." The operations such as touch, release, slide, and touch and release, performed with respect to the touch panel 38 are generally referred to as a "touch operations."

Here, an explanation is provided regarding the operation of the mobile phone 10 according to the present embodiment when incoming calls are received. When an incoming call is received from another telephone, a correspondence selection screen 60 as shown in FIG. 11 (A) is displayed on the display 30 of the mobile phone 10. This correspondence selection screen 60 is intended to select correspondences with respect to the incoming call from other telephone. As shown in FIG. 11 (A), the display area 60a and the display area 60b are provided on the correspondence selection screen 60.

The radio field intensity, battery level, date and time are displayed on the display area 60a (the same applies to display areas 70a, 80a, and 90a, which will be described subsequently). Originator information 600 is displayed on the display area 60b. In the present embodiment, the originator information comprises an image 600a registered for the originator, the name of the originator displayed underneath the originator information 600, the phone number of the terminal used by the originator, and the type of terminal used by the originator (mobile phone or home electronics). The image 600a is a photograph of the face of the caller, or an image registered in or downloaded to the mobile phone 10 in advance (character image). However, if an image is not registered for the caller, an image 600a of a card is displayed describing as such (no image). The name of the originator is a name or a nickname registered for the caller. A message indicating that this information of the caller (an operation area 650, which will be described subsequently) should be touched is also displayed on the display area 60b.

A button image 602 is displayed above the originator information 600 on the display area 60b, and at the same time, a button image 604 and a button image 606 are displayed side-by-side underneath the originator information 600. The button image 602 is provided in order to select to answer (accept) the incoming call. The button image 604 is provided in order to select to ignore the incoming call. The button image 606 is provided in order to select to ignore the incoming call while simultaneously transmitting a message (ignore with text) to the caller (originator) of the incoming call.

The detection range of the touch panel 38 is set corresponding to the operation area of the button images 602 to 606, respectively. That is, the coordinate data group regarding each detection range is associated with the correspondence selection screen 60, and at the same time, the corresponding button images 602 to 606 are stored in the RAM 34 so as to be identifiable.

Therefore, when the coordinate data is input from the touch panel 38, it is determined whether or not this coordinate data is within the detection range corresponding to the operation area of the button images 602 to 606. That is, it is determined whether or not the touch point indicated by the coordinate data input from the touch panel 38 is within the operation area (the display area) of the button images 602 to 606. If the coordinate data is within the detection range of any of the button images, a correspondence (function) is set (allocated) from the button images 602 to 606 corresponding to the operation area in which the detection range is set. However, if coordinates outside the detection range corresponding to the operation area, which is set for the button images 602 to 606, are detected, it is determined that an area or a position different from the operation area of the button images 602 to 606 is touched. In such cases, the correspondence set in the button images 602 to 606 is not selected.

Note that the present embodiment is constituted such that the correspondence is selected by touching the button images 602 to 606; however, it may be constituted such that it is selected using the key input device 26. For example, if the talk key 26a is turned on, answering the incoming call is selected, if the end key 26c is turned on, ignoring the incoming call is selected, and if the function key 26b is turned on, ignoring the incoming call while simultaneously transmitting a message is selected.

If any of the button images 602 to 606 is touched and the correspondence is selected, an execution screen 70, as shown in FIG. 11 (B), is displayed on the display 30. However, FIG. 11 (B) shows the execution screen 70 for cases in which, for the correspondence selection screen 60, shown in FIG. 11 (A), touching the button image 602 and answering the incoming call is selected.

As shown in FIG. 11 (B), the execution screen 70 comprises the display area 70a and the display area 70b. As described above, information such as the radio field intensity is displayed on the display area 70a. Originator information 700, an object image 702, an index image 704, and a character string 706 are displayed on the display area 70b. The originator information 700 is the same as the originator information 600, comprising an image 700a in which the originator is registered, the name of the originator, the phone number of the terminal used by the originator; and the type of terminal used by the originator.

The object image 702 is provided in order to provide the command to perform the correspondence selected on the correspondence selection screen 60. The index image 704 is displayed in order to notify the user of the action for performing the correspondence selected on the correspondence selection screen 60. The index image 704, in which V-shaped letters of varying size are vertically disposed, is displayed on the execution screen 70, shown in FIG. 11 (B). The character string 706 is text displaying the correspondence selected on the correspondence selection screen 60. As above, FIG. 11 (B) indicates the execution screen 70 for cases in which answering the incoming call is selected; therefore, in this example, the character string 706, specifically "Answer," is displayed. If ignoring the incoming call is selected, the character string 706, specifically "Ignore," is displayed, and if ignoring the incoming call while simultaneously transmitting a message to the originator of the incoming call is selected, the character string 706, specifically "Ignore+Transmit message" is displayed.

In the present embodiment, as shown in FIG. 12 (A), when the user touches the object image 702 and slides it, the object image 702 is moved on the execution screen 70 in accordance with this slide, that is, in accordance with the movement of the touch point. In the present embodiment, as shown in FIG. 12 (B), when the user moves the object image 702 by sliding it, the correspondence selected on the correspondence selection screen 60 is performed in accordance with the index image 704. However, the slide distance (the amount of displacement of the touch point) is more than the predefined time (for example, dozens of pixels).

For cases in which the object image 702 is touched in the release state and sliding is performed as is (without releasing) in order to prevent operational errors, the object image 702 is moved. For sliding in cases in which the object image 702 is not moved, this is ineffective even if the distance is more than the predefined distance.

If it is released without sliding for more than the predefined distance, the object image 702 is returned to the initial position, in order to execute sliding again.

The direction of a slide, if it is downwards, may be diagonal. This can be determined, based on vertical changes in components, among the coordinates shown by the coordinate data. For example, as shown in FIG. 12 (A), for the coordinate system of the touch panel 38, the lateral direction is set as the X-axial direction and the vertical direction is set as the Y-axial direction. The positive direction of the X-axis is rightwards and the positive direction of the Y-axis is upwards. Therefore, for cases in which the Y-axis component of the coordinate of the touch position decreases, it is clear that the object image 702 moves downwards.

The slide distance is the difference between the touch point when the object image 702 is first touched (touch start position) and the current touch point (touch current position). The slide distance may be the length of the trajectory that is touched. In such cases, for each predefined time (1 frame), the distance between the touch point of the current frame and the touch point of the previous frame is calculated and accumulated. However, it may also be constituted such that instead of the slide distance, the moving distance of the object image 702 is calculated.

Note that in the present embodiment, when commanding the correspondence to be performed, it is slid in a predefined direction for more than a predefined distance; however, regardless of the slide direction, if a slide longer than the predefined distance is detected, performing the selected correspondence may be commanded.

In the present embodiment, the object image 702 is moved, in accordance with the slide; however, the object image 702 may not have to be moved.

In the present embodiment, the user is induced to slide, so as to move the object image 702, in order to prevent operational errors as much as possible; however, for the execution screen 70, operational errors can be prevented to some extent even by touching the object image 702. This is due to the fact that, in the present embodiment, once a correspondence is selected on the correspondence selection screen 60, execution of the selected correspondence is commanded on the execution screen 70; consequently, the correspondence is not performed simply by selecting the correspondence on the correspondence selection screen 60.

A detailed explanation is omitted; however, on the execution screen 70, if the object image 702 is not touched for more than the predefined time (for example, 30 seconds), and the same position outside the range (the corresponding detection range) of the operation area of the object image 702 is continuously touched for more than a predefined time (for example, 5 seconds), or if the area outside the range of the operation area of the object image 702 is continuously touched more than a predefined number of times (for example, 3 times), communications may be disconnected with the telephone of the originator, the incoming call may be suspended, or voice-mail recording may be started.

A detailed explanation is omitted; however, as shown in FIG. 11 (A) and FIG. 11 (B), the button images 602 to 606 displayed on the correspondence selection screen 60 and the object image 702 provided on the execution screen 70 are set on the display area of the display 30 so as not to overlap with each other. As above, the object image 702 is moved only if it is touched from the state in which it is released. Therefore, for cases in which the correspondence selection screen 60 is displayed, even if the button images 602 to 606 are mistakenly touched and sliding is performed, the object image 702 is rarely moved on the execution screen 70. That is, it can prevent, as much as possible, some correspondences from being performed with respect to the incoming call, without the user intending to do so.

On the correspondence selection screen 60, shown in FIG. 11 (A), if the button image 602 is touched and answering the incoming call is selected, and on the execution screen 70, if it is commanded to perform, once a communicable state is established with the terminal (telephone) of the originator, normal call processing is performed. At this time, the screen during call 80, as shown in FIG. 13 (A), is displayed on the display 30. As shown in FIG. 13 (A), the screen during call 80 comprises the display area 80a and the display area 80b. The radio field intensity, etc., is displayed on the display area 80a and the time from starting the call (call time) is displayed on the display area 80b.

If call processing is started and the mobile phone 10 is brought into close proximity of the face (ear) of the user, and if this is detected by the processor 24 based on the amount of light received from the proximity sensor 40, the power of the display 30 is turned off. This is intended to save unnecessary power consumption. This is because during a call, while the user is engaged in conversation with the intended party, the user does not see the display 30. Similarly, if the user is in conversation with the intended party during the call, the user does not operate the touch panel 38; consequently, the power of the touch panel 38 is also turned off.

Note that if the proximity sensor 40 is not provided, call processing is started and after a predefined time (for example, 3 to 15 seconds) elapses, the power of the display 30 or the touch panel 38 may be turned off. For example, the user can set the predefined time.

On the correspondence selection screen 60 shown in FIG. 11 (A), if the button image 604 is touched and ignoring the incoming call is selected, and if it is commanded to perform this on the execution screen 70, the mobile phone 10 disconnects the communication. That is, the power is turned off without answering. Consequently, the output (play) of the ringtone is stopped. However, if it is set to silent mode and the vibrator is operated, the action (drive) is stopped. If the ringtone is output simultaneously with operation of the vibrator, both are stopped. Note that in order to indicate incoming calls with lighting or blinking of the illuminating device such as the LED, the illuminating device is turned off. Accordingly, if the mobile phone 10 disconnects communications, the telephone of the originator also disconnects communications in response. That is, transmission is stopped.

Processing to compose and transmit the message is performed if the button image 606 is touched and ignoring the incoming call while simultaneously transmitting a message is selected on the correspondence selection screen 60 shown in FIG. 11 (A), and if this command is conducted on the execution screen 70 shown in FIG. 11 (B), after the incoming call is ignored and after the communication of the mobile phone 10 is disconnected.

Note that the action for cases in which the incoming call is ignored is as described above; therefore, a duplicated explanation is omitted.

If the incoming call is ignored and the message is composed and transmitted, the message composition screen 90 as shown in FIG. 13 (B) is first displayed on the display 30. This message composition screen 90 comprises the display area 90a, the display area 90b, the display area 90c, and the display area 90d.

The radio field intensity, etc. is displayed on the display area 90a, and as the destination of the message, the originator of the incoming call to be ignored, that is, the telephone number of the telephone of the originator is displayed on the display area 90b. However, if the originator information is registered in the address book of the mobile phone 10, the name of the caller may be displayed. An input screen of the message is displayed on the display area 90c. Soft keys 100, etc., are displayed on the display area 90d. For example, the soft keys 100 comprise button images for inputting alphabetical characters, symbols, and numeric characters. A button image 102 for commanding completion of message composition and message transmission is displayed.

The operation area is set, corresponding to the respective button image of the soft keys 100 and the display area of the button image 102, and the detection range of the touch panel 38 is set, corresponding to each operation area. Specifically, the coordinate data group defining the detection range of the touch panel 38 corresponding to the operation area of the respective button image is associated with this message composition screen 90 and stored in the RAM 34. However, since the detection range corresponding to the button image is rectangular, the coordinate data for the coordinates of the four vertices or the two diagonal vertices may be stored. However, the coordinate data regarding the detection range of either button images is stored so as to be identifiable.

Therefore, if the user performs the touch operations on the soft keys 100, corresponding characters (here, alphabetical characters, symbols, or numeric characters) are input (displayed) on the display area 90c. However, for cases of Roman character input, alphabetical characters are converted to Kana characters. When inputting in Japanese language (Kana characters), Hiragana characters are displayed on the soft keys 100.

If the user touches the button image 102, message composition is completed, and the composed message is simultaneously transmitted to the terminal of the destination displayed on the display area 90b, for example, with a short message service (SMS). However, if the mobile phone 10 comprises an e-mail function, the message may be transmitted to the telephone of the caller by e-mail. In such cases, an e-mail address set in the telephone is input to the destination, and the composed message is set in the text of the e-mail.

Note that in the present embodiment, if ignoring the incoming call while simultaneously transmitting a message is selected on the correspondence selection screen 60, it is constituted such that once communication is disconnected, the message is immediately composed; however, one message may be selected and transmitted from one or a plurality of messages composed in advance. In such cases, instead of the message composition screen 90, a screen for selecting a message composed in advance may be displayed.

If there is an incoming call (incoming call interrupt) from another telephone during a call, by moving the mobile phone 10 away from the face (ear) of the user, the power of the display 30 and the touch panel 38 are turned on and the correspondence selection screen 60 is displayed on the front surface of the screen during call 80 of the intended party currently taking the call. Therefore, the user, as described above, can select to answer, ignore, or ignore while transmitting a message to the incoming call interrupt, by touching the button images 602, 604, and 606.

In this way, if there is an incoming call interrupt, by moving the mobile phone 10 away from the face of the user, the correspondence selection screen 60 is displayed on the display 30. This, as described above, is different from cases of incoming calls, which are not an incoming call interrupt (hereinafter may be referred to as a "normal incoming call").

However, the method for selecting the correspondence using the correspondence selection screen 60 and the method for commanding performance using the execution screen 70 are the same even for cases of the incoming call interrupt; therefore, a duplicated explanation is omitted.

If answering the incoming call interrupt is selected and the command to perform this is given, a communicable state is established with the originator of the incoming call interrupt, and call processing is performed with the originator of the incoming call interrupt. At this time, call processing with the originator performing call processing is suspended. If call processing with the originator of the incoming call interrupt is completed, the previous call processing that was placed on hold is resumed.

If ignoring the incoming call interrupt is selected and the command to perform this is given, the communicable state is established with the originator of the incoming call interrupt and voice-mail recording is started. If voice-mail recording is started, the audio signals of the message indicating that the user is not able to take the call are transmitted to the originator of the incoming call interrupt, and subsequently, recording of the audio signals (received audio signals) of the message from the user of the telephone, which is the originator of the incoming call interrupt, is started. However, this voice-mail recording is performed in parallel to call processing with the previous intended party. When voice-mail recording is completed, the mobile phone 10 disconnects communications with the originator of the incoming call interrupt. For example, the mobile phone 10 detects that voice-mail recording is completed as the telephone of the originator of the incoming call interrupt disconnects the communication; therefore, it disconnects communication with the telephone of the originator of the incoming call interrupt.

Note that if, instead of voice-mail recording, a telephone service provider provides a voice-mail service, the message is recorded to a system operated and managed by the telephone service provider. In this case, if ignoring the incoming call interrupt is selected, the mobile phone 10 disconnects communications with the telephone of the originator of the incoming call interrupt, and subsequently, the telephone of the originator of the incoming call interrupt is connected to the system operated and managed by the telephone service provider, on which the user of the telephone of the originator can record a message.

If ignoring the incoming call interrupt while simultaneously transmitting a message is selected, and if it is commanded to perform this, as above, a communicable state is established with the originator of the incoming call interrupt and voice-mail recording is started. Once voice-mail recording is completed, the mobile phone 10 disconnects communications with the telephone of the originator of the incoming call interrupt. The message composition screen 90 is displayed on the front surface of the screen during call 80 of the telephone currently taking the call. However, the telephone number of the telephone of the originator of the incoming call interrupt is input to the destination of the message composition screen 90. The composition and transmission of the message are as described above; therefore, a duplicated explanation is omitted.

Figure 14:
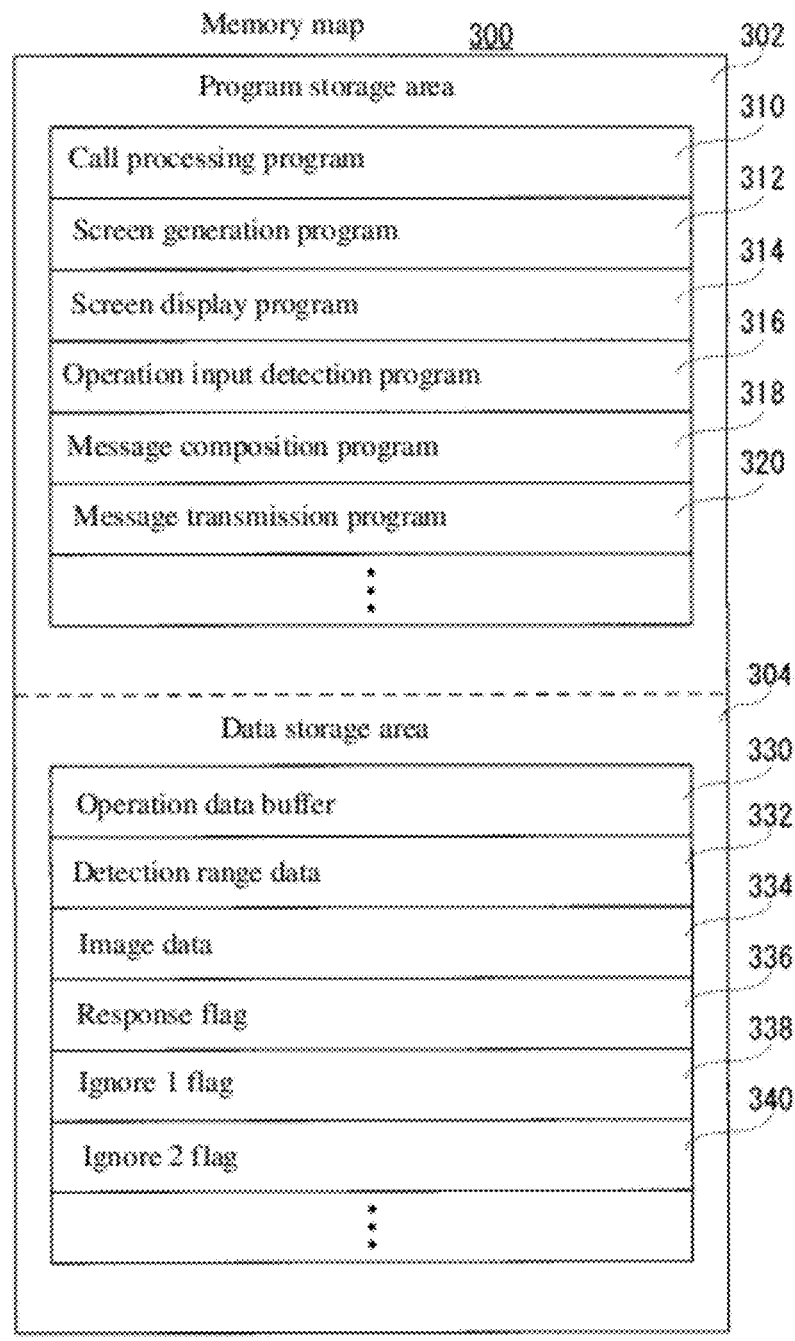
FIG. 14 is a diagram showing an example of the memory map of the RAM.

FIG. 14 is a schematic diagram showing the memory map 300 of the RAM 34 shown in FIG. 1. As shown in FIG. 14, the RAM 34 comprises the program storage area 302 and the data storage area 304. The program storage area 302 stores a control program of the mobile phone 10 with this control program comprising the call processing program 310, the screen generation program 312, the screen display program 314, the operation input detection program 316, the message composition program 318, the message transmission program 320, etc.

The call processing program 310 is, as described above, a program for performing transmission processing, incoming processing, normal call processing, and interrupt processing. The screen generation program 312 is a program for generating display image data corresponding to the screen (60, 70, 80, 90, etc.) for displaying on the display 30, using the image data 334, which is described subsequently. The screen display program 314 is a program for displaying the screen corresponding to the display image data generated on the display 30, in accordance with the screen generation program 312.

The operation input detection program 316 is a program for detecting the key data input from the key input device 26 and the coordinate data input from the touch panel 38 via the touch panel control circuit 36 and for storing (temporarily storing) in the operation data buffer 330, which is described subsequently. The message composition program 318 is a program for composing a message using the message composition screen 90, in accordance with a command from the user. The message transmission program 320 is a program for transmitting a message composed in accordance with the message composition program 318 to the telephone of the destination (originator), in accordance with the command from the user.

An audio output program for outputting (playing) the ringtone (melody) and music, and each program for performing various functions (e-mail, address book, calculator, schedule, etc.) are stored in the program storage area 302.

The operation data buffer 330 is comprised in the data storage area 304. The detection range data 332 and the image data 334 are stored in the data storage area 304. A response flag 336, an ignore 1 flag 338, and an ignore 2 flag 340 are comprised in the data storage area 304.

The operation data buffer 330 temporarily stores the key data input from the key input device 26 and the coordinate data input from the touch panel 38. The key data and the coordinate data, which are temporarily stored in the operation data buffer 330, are deleted (erased) after they are used for processing by the processor 24.

The detection range data 332 is, as described above, a coordinate data group of the detection range stored by associating with each screen, storing the operation area of the corresponding button image so as to be identifiable.

The image data 334 is image data or data for character images, for a template for generating the display image data of each screen (60, 70, 80, 90, etc.).

The response flag 336 is a flag for determining whether or not answering the incoming call is selected and may, for example, be a one-bit register. For example, if answering the incoming call is selected, the response flag 336 is turned on and a data value of "1" is set in the register. In contrast, if answering the incoming call is not selected, the response flag 336 is turned off and a data value of "0" is set in the register.

The ignore 1 flag 338 is a flag for determining whether or not ignoring the incoming call is selected and may, for example, be a one-bit register. For example, if ignoring the incoming call is selected, the ignore 1 flag 338 is turned on and a data value of "1" is set in the register. In contrast, if ignoring the incoming call is not selected, the ignore 1 flag 338 is turned off and a data value of "0" is set in the register.

The ignore 2 flag 340 is a flag for determining whether or not ignoring the incoming call while simultaneously transmitting a message is selected and may, for example, be a one-bit register. For example, if ignoring the incoming call while simultaneously transmitting a message is selected, the ignore 2 flag 340 is turned on and a data value of "1" is set in the register. In contrast, if ignoring the incoming call while simultaneously transmitting a message is not selected, the ignore 2 flag 340 is turned off and a data value of "0" is set in the register.

Audio data for the ringtone (melody and music), etc. are also stored. If commanded to read the profile or the address book, the corresponding data is loaded from the flash memory 32 to the RAM 34. The audio data for the message recorded with the voice-mail recording is moved (saved) to the flash memory 32, after being temporarily stored in the RAM 34 (the data storage area 304).

Figure 15:
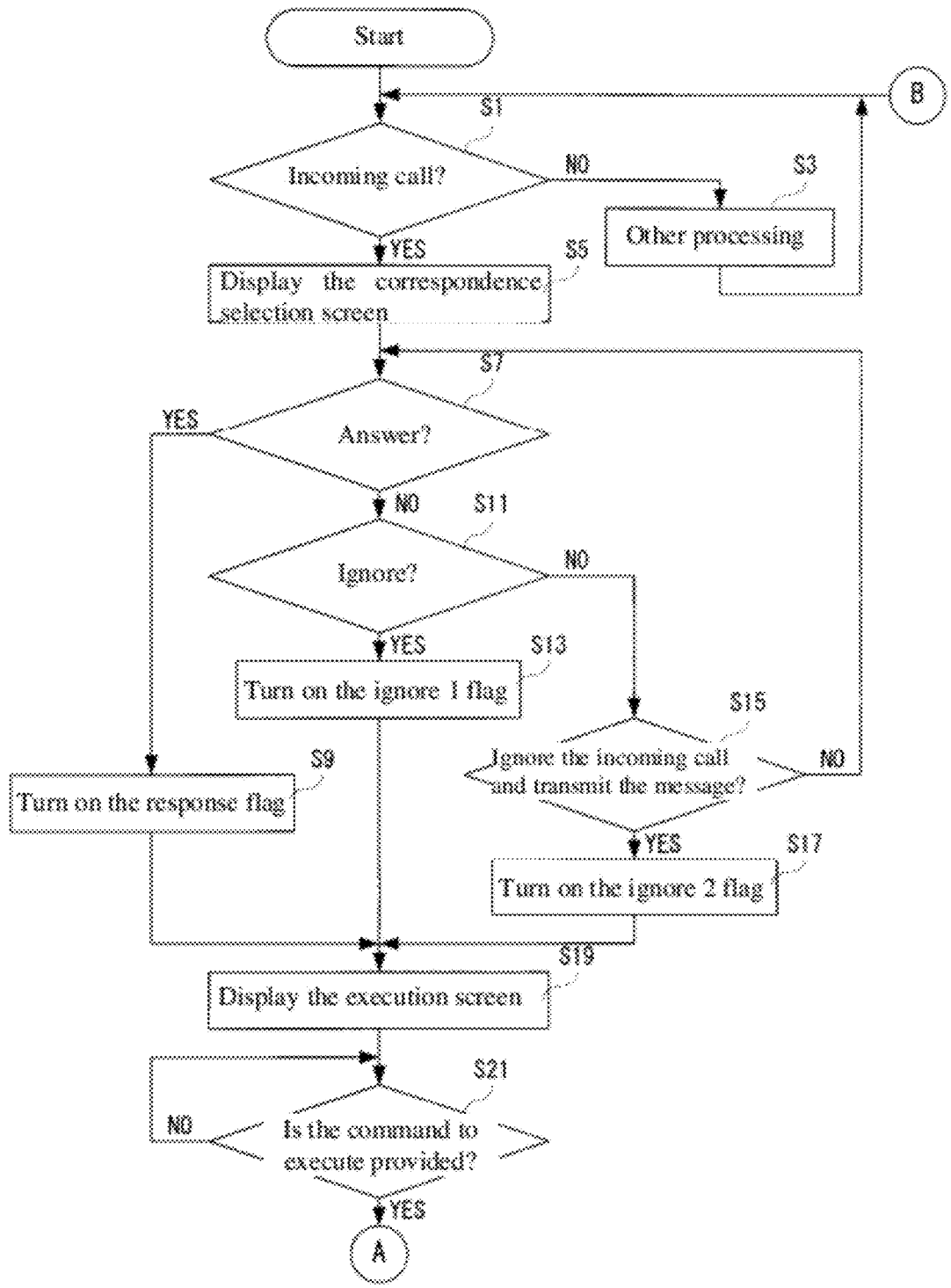
FIG. 15 is a flow diagram showing a part of the overall processing of the processor.
Figure 16:
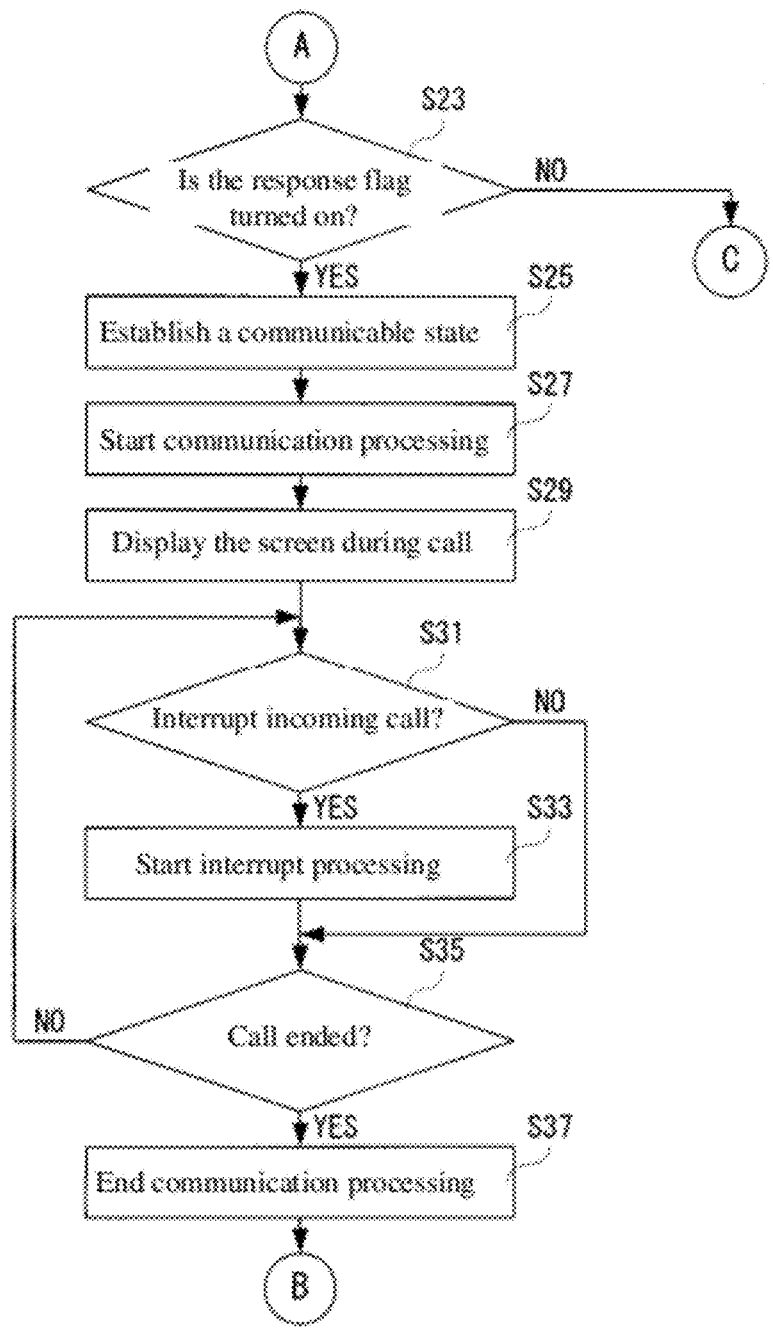
FIG. 16 is a flow diagram showing another part of the overall processing of the processor.
Figure 17:
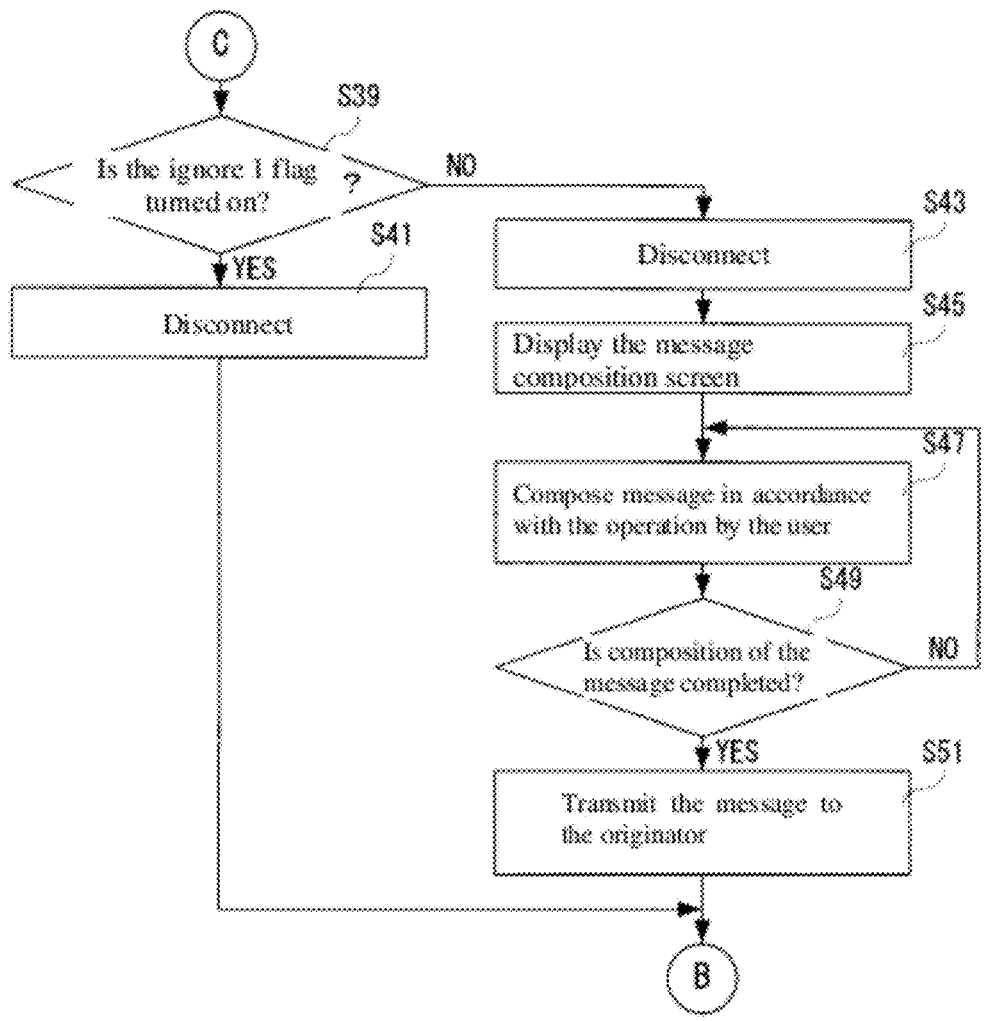
FIG. 17 is a flow diagram showing yet another part of the overall processing of the processor.

FIG. 15 to FIG. 17 are flow diagrams showing the overall processing of the processor 24. When the power of the mobile phone 10 is turned on, the processor 24 starts overall processing, and at Step S1, it determines whether or not there is an incoming call (normal incoming call). That is, the processor 24 determines whether or not transmission signals are received from another telephone. If it is "NO" at Step S1, that is, if there is no incoming call, at Step S3, other processing is performed and it returns to Step S1. Examples of other processing include: transmission processing, normal call processing resulting from transmission processing, interrupt processing in the middle of call processing (refer to FIG. 18 and FIG. 20), the respective processing of receiving, composing, and transmitting e-mails, the respective processing of registering and reading (referencing) the profile or the address book, calculation processing of a calculator, the respective processing of displaying, inputting, and deleting a schedule, etc. However, processing other than interrupt processing, which is described subsequently, is already well-known, and is not essential in terms of the present case; therefore, a detailed description is omitted.

On the other hand, if it is "YES" at Step S1, that is, if there is an incoming call, at Step S5, the incoming call screen 60 as shown in FIG. 11 (A) is displayed on the display 30. At this time, the processor 24 outputs the ringtone from the speaker 22, etc. At the subsequent Step S7, it is determined whether or not answering is selected. That is, the processor 24 determines whether or not the coordinate data input from the touch panel 38 is within the detection range corresponding to the operation area of the button image 602, by referring to the detection range data 332.

If it is "YES" at Step S7, that is, if the coordinate data is within the detection range corresponding to the operation area of the button image 602, it determines that answering is selected, and at Step S9, the response flag 336 is turned on before it proceeds to Step S19. If the response flag 336 is turned on, the ignore 1 flag 338 and the ignore 2 flag 340 are turned off. However, if the processor 24 starts overall processing, all the flags (336 to 340) may be turned off. The same applies to cases in which the ignore 1 flag 338 and the ignore 2 flag 340 are turned on.

In contrast, if it is "NO" at Step S7, that is, if the coordinate data is not input or if the coordinate data is outside the detection range corresponding to the operation area of the button image 602, it determines that answering the incoming call is not selected, and at Step S11, determines whether or not ignoring is selected.

If it is "YES" at Step S11, that is, if the coordinate data is within the detection range corresponding to the operation area of the button image 604, it determines that ignoring the incoming call is selected, and at Step S13, the ignore 1 flag 338 is turned on before it proceeds to Step S19. If the ignore 1 flag 338 is turned on, the response flag 336 and the ignore 2 flag 340 are turned off.

In contrast, if it is "NO" at Step S11, that is, if the coordinate data is not input or if the coordinate data is outside the detection range corresponding to the operation area of the button image 604, it determines that ignoring the incoming call is not selected, and at Step S15, it determines whether or not ignoring while simultaneously transmitting a message is selected.

If it is "YES" at Step S15, that is, if the coordinate data is within the detection range corresponding to the operation area of the operation area of the button image 606, it determines that ignoring while simultaneously transmitting a message is selected, and at Step S17, the ignore 2 flag 340 is turned on before it proceeds to Step S19. If the ignore 2 flag 340 is turned on, the response flag 336 and the ignore 1 flag 338 are turned off.

In contrast, if it is "NO" at Step S15, that is, if the coordinate data is not input, or if the coordinate data is outside the detection range corresponding to the operation area of the button image 606, it determines that ignoring while simultaneously transmitting a message is not selected and returns to Step S7.

Note that in the present embodiment, if it is "NO" at Step S15, that is, if none of the button images 602 to 606 is touched (if there are no corresponding selection commands), it returns to Step S7, as is; however, it is not necessarily limited to this. For example, if the button images 602 to 606 are not touched for more than a predefined time (for example, 30 seconds), if the same position outside the range of the operation area of the button images 602 to 606 (corresponding detection range) is continuously touched for more than a predefined time (for example, 5 seconds), or if the area outside the operation area of the button images 602 to 606 is continuously touched more than a predefined number of times (for example, 3 times), communications may be disconnected with the telephone of the originator, the incoming call may be suspended, or voice-mail recording may be started. The same applies to cases in which the presence of selections for correspondence is detected for interrupt processing, which is described subsequently.

At Step S19, the execution screen 70 as shown in FIG. 11 (B) is displayed on the display 30. A detailed explanation is omitted; however, for the execution screen 70 displayed at Step S19, the content of the character string 706 differs depending on whether or not one of the response flag 336, the ignore 1 flag 338, or the ignore 2 flag 340 is turned on. Next, at Step S21, it determines whether or not a command to perform is given. In the present embodiment, for the processor 24, at Step S21, in the release state, it determines whether or not the object image 702 is touched and sliding is performed downwards for more than the predefined distance.

If it is "NO" at Step S21, that is, if the command to perform is not given, it returns to Step S21, as is. In contrast, if it is "YES" at Step S21, that is, if the command to perform is given, it proceeds to Step S23 shown in FIG. 16.

Note that in FIG. 15 to FIG. 17, it is omitted; however, after processing at Step S19, until it is determined to be "YES" at Step S21, as shown in FIG. 12 (A) and FIG. 12 (B), in the release state, if the object image 702 is touched and slid as is, the execution screen 70 showing the state in which the object image 702 is moved according to the slide is displayed. However, if it is released without sliding for more than the predefined distance, the object image 702 is returned its initial position.

For example, if the object image 702 is not touched for more than a predefined time (for example, 30 seconds), if the same position outside the range of the operation area of the object image 702 (corresponding detection range) is continuously touched for more than a predefined time (for example, 5 seconds), or if the area outside the operation area of the object image 702 is continuously touched more than a predefined number of times (for example, 3 times), communications may be disconnected with the telephone of the originator, the incoming call may be suspended, or voice-mail recording may be started. The same applies to cases in which it is determined whether or not the command to perform is given for interrupt processing, which is described subsequently.

At Step S23 shown in FIG. 16, it determines whether or not the response flag 336 is turned on. If it is "NO" at Step S23, that is, if the response flag 336 is turned off, it proceeds to Step S39 shown in FIG. 17. In contrast, if it is "YES" at Step S23, that is, if the response flag 336 is turned on, at Step S25, the communicable state (connection state) is established with the telephone of the originator. At Step S27, call processing is started, and at Step S29, the screen during call 80 as shown in FIG. 13 (A) is displayed on the display 30.

When call processing is started, if the processor 24 receives the received audio signals from the intended party, it outputs the received signals corresponding to these received audio signals from the speaker 22 and, in response, transmits a sound (call sound) of the user detected via the microphone 18 to the telephone of the intended party as transmission audio signals.

At the subsequent Step S31, it determines whether or not there is an incoming call interrupt. That is, the processor 24 determines whether or not there is an incoming call from another telephone, which is different from the telephone that is currently taking the call. If it is "NO" at Step S31, that is, if there is no incoming call interrupt, it proceeds to Step S35, as is. In contrast, if it is "YES" at Step S31, that is, if there is an incoming call interrupt, at Step S33, it starts interrupt processing (refer to FIG. 18 to FIG. 20), which is described subsequently, and proceeds to Step S35. However, interrupt processing is performed in parallel to the overall processing by the processor 24 by multi-tasking.

At Step S35, it determines whether or not the call ended. That is, the processor 24 receives call end signals from the intended party and determines whether or not the user pressed the end key 26c. If it is "NO" at Step S35, that is, if the call did not end, it returns to Step S31 and continues call processing. In contrast, if it is "YES" at Step S35, that is, if the call ended, at Step S37, it ends call processing and returns to Step S1 shown in FIG. 15. At Step S37, the processor 24 ends call processing in response to the call end signals being received from the intended party. At Step S37, the processor 24, in response to the end key 26c being pressed by the user, controls the wireless communication circuit 14 and transmits call end signals to the intended party, subsequently, ending call processing.

As above, if it is "NO" at Step S23 and proceeds to Step S39 shown in FIG. 17, it determines whether or not ignoring the incoming call is selected. If it is "YES" at Step S39, that is, if the ignore 1 flag 338 is turned on, at Step S41, it disconnects communication and returns to Step S1 shown in FIG. 15. At this time, the communication is disconnected at the telephone of the originator in response to the mobile phone 10 disconnecting the communication.

In contrast, if it is "NO" at Step S39, that is, if the ignore 2 flag 340 is turned on, at Step S43, it disconnects communication. At Step S45, the message composition screen 90 as shown in FIG. 13 (B) is displayed on the display 30. At the subsequent Step S47, a message is composed in accordance with the operation by the user. That is, text, characters, etc., in accordance with the operation of the soft keys 100 are input (displayed) on the display area 90c. However, the processor 24, by referring to the detection range data 332 and using the soft keys 100, inputs alphabetical characters, symbols, or numeric characters indicated by the keys (the button image) displayed on the display area of the operation area, corresponding to the detection range including the coordinate data.

At the subsequent Step S49, it determines whether message composition is completed. That is, the processor 24 determines whether or not the coordinate data is within the detection range corresponding to the operation area of the button image 102, by referring to the detection range data 332. If it is "NO" at Step S49, that is, if the coordinate data is within the detection range of the operation area of the button image 102, it determines that message composition is not complete, returns to Step S47, and continues composing the message. In contrast, if it is "YES" at Step S49, that is, if the coordinate data is within the detection range corresponding to the operation area of the button image 102, it determines that message composition is completed, and at Step S51, transmits the composed message to the originator before returning to Step S1.

Figure 18:
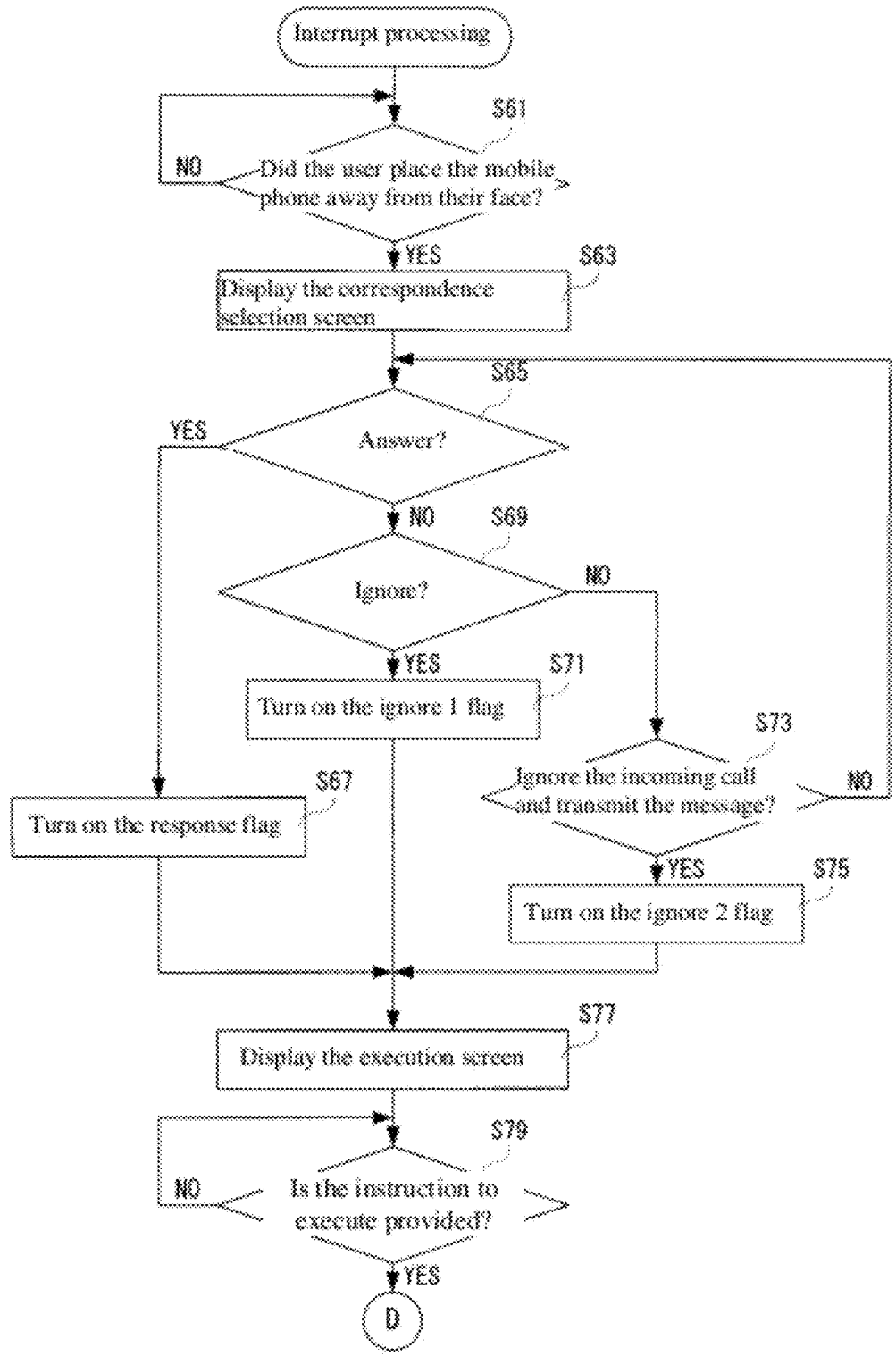
FIG. 18 is a flow diagram showing some of the interrupt processing of the processor.
Figure 20:
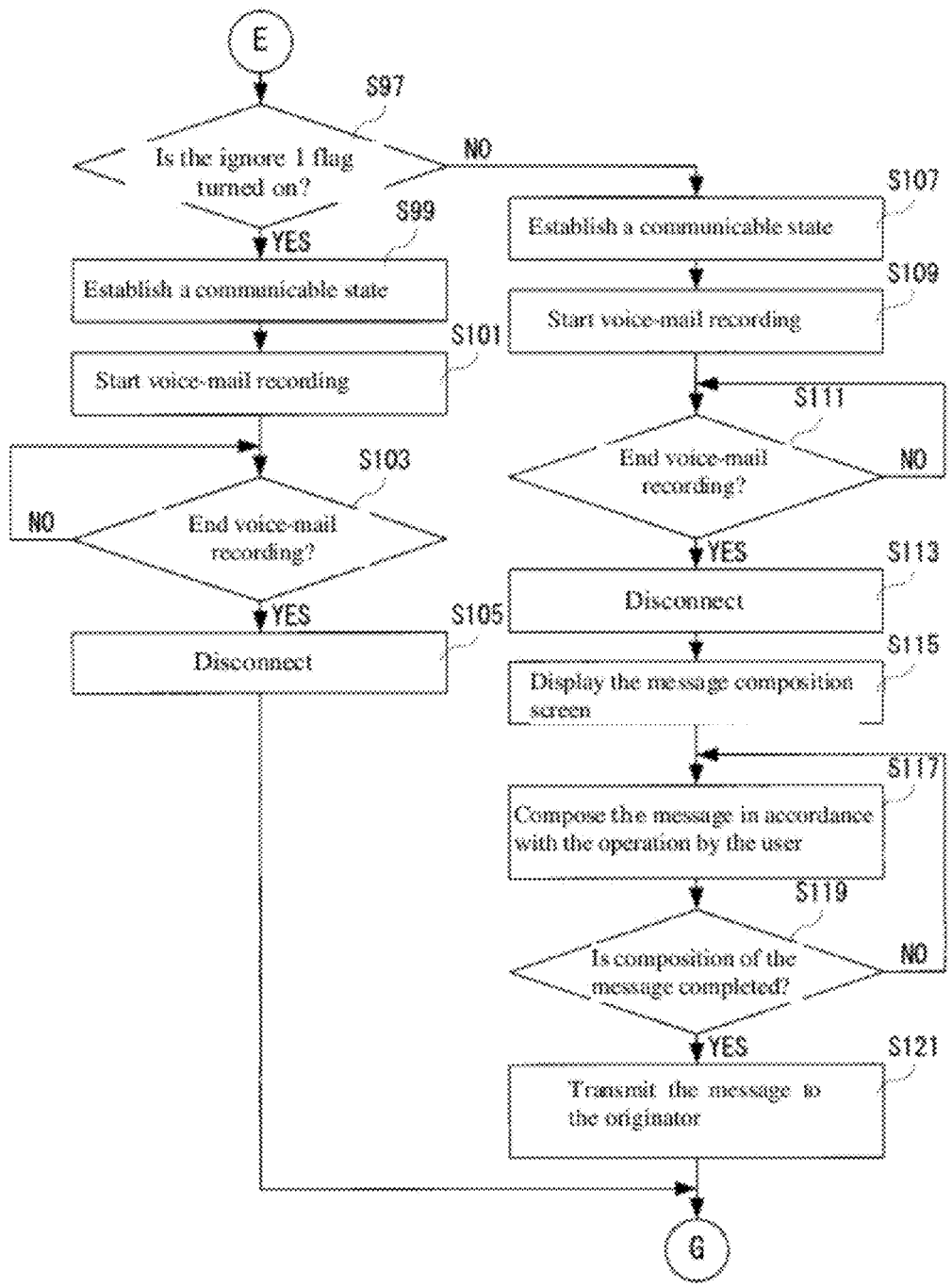
FIG. 20 is a flow diagram showing some other parts of the interrupt processing of the processor.

FIG. 18 and FIG. 20 are flow diagrams showing interrupt processing of the processor 24. Hereinafter, this interrupt processing is described; however, the same processing as the processing for the overall processing as described above is briefly described.

As shown in FIG. 18, once the processor 24 starts interrupt processing, at Step S61, it determines whether or not the user moved the mobile phone 10 away from their face. As above, the processor 24, according to the amount of infrared rays received, as detected at the proximity sensor 40, determines whether or not this proximity sensor 40 (the mobile phone 10) is nearing the face of the user. If it is "NO" at Step S61, that is, if the user is not moving the mobile phone 10 away from their face, it returns to Step S61, as is.

Note that in the present embodiment, if the user is not moving the mobile phone 10 away from their face, it returns to Step S61, as is; however, if this state continues for more than a predefined time (for example, 5 to 10 seconds), it may disconnect communications with the incoming call interrupt, or it may disconnect communications after voice-mail recording is performed.

In contrast, if it is "YES" at Step S61, that is, if the user moves the mobile phone 10 away from their face, at Step S63, the correspondence selection screen 60, as shown in FIG. 11 (A), is displayed on the display 30. At this time, the correspondence selection screen 60 is displayed on the front surface of the screen during call 80 for the intended party currently taking the call.

Note that if it is "YES" at Step S61, once the power of the display 30 and the touch panel 38 is turned on, processing of Step S63 is performed.

At the subsequent Step S65, it determines whether or not answering the incoming call interrupt is selected. If it is "YES" at Step S65, that is, if answering the incoming call interrupt is selected, at Step S67, it turns on the response flag 336 and proceeds to Step S77.

In contrast, if it is "NO" at Step S65, that is, if answering the incoming call interrupt is not selected, at Step S69, it determines whether or not ignoring the incoming call interrupt is selected. If it is "YES" at Step S69, that is, if ignoring the incoming call interrupt is selected, at Step S71, it turns on the ignore 1 flag 338 and proceeds to Step S77.

In contrast, if it is "NO" at Step S69, that is, if ignoring the incoming call interrupt is not selected, at Step S73, it determines whether or not ignoring the incoming call interrupt while simultaneously transmitting a message is selected. If it is "NO" at Step S73, that is, if ignoring the incoming call interrupt while simultaneously transmitting a message is not selected, it returns to Step S65, as is. In contrast, if it is "YES" at Step S73, that is, if ignoring the incoming call interrupt while simultaneously transmitting a message is selected, at Step S75, it turns on the ignore 2 flag 340 and proceeds to Step S77.

At Step S77, the execution screen 70 is displayed on the display 30. At Step S79, it determines whether or not the command to perform is given. If it is "NO" at Step S79, it returns to the same Step S79, as is. In contrast, if it is "YES" at Step S79, at Step S81 shown in FIG. 19, it determines whether or not the response flag 336 is turned on.

If it is "NO" at Step S81, it proceeds to Step S97 shown in FIG. 20. In contrast, if it is "YES" at Step S81, at Step S83, it suspends the call with the previous intended party, and at Step S85, it establishes a communicable state with the telephone of the originator of the incoming call interrupt before starting call processing for interrupt at Step S87. However, if the call with the previous intended party is suspended, overall processing reaches a state in which processing of Step S35 is stopped (temporarily stopped).

At the subsequent Step S89, the screen during call 80 of call processing for the interrupt is displayed on the display 30. At Step S91, it determines whether or not the call ended. If it is "NO" at Step S91, it returns to the same Step S91. In contrast, if it is "YES" at Step S91, at Step S93, it ends call processing for the incoming call interrupt. At Step S95, it resumes call processing with the telephone of the intended party currently put on hold and ends interrupt processing. That is, at Step S95, processing of Step S35 that is currently stopped (temporarily stopped) is resumed.

As above, if it is "NO" at Step S81 and proceeds to Step S97 shown in FIG. 20, it determines whether or not the ignore 1 flag 338 is turned on. If it is "YES" at Step S97, at Step S99, it establishes a communicable state (connection state) with the telephone of the originator of the incoming call interrupt, and at Step S101, it starts voice-mail recording. Here, the processor 24 transmits the audio signals for the message indicating that the call cannot be answered to the originator of the incoming call interrupt and starts recording the received audio signals from the user of the telephone, which is the originator of the incoming call interrupt. The received audio signals for recording are temporarily stored in the RAM 34.

Figure 19:
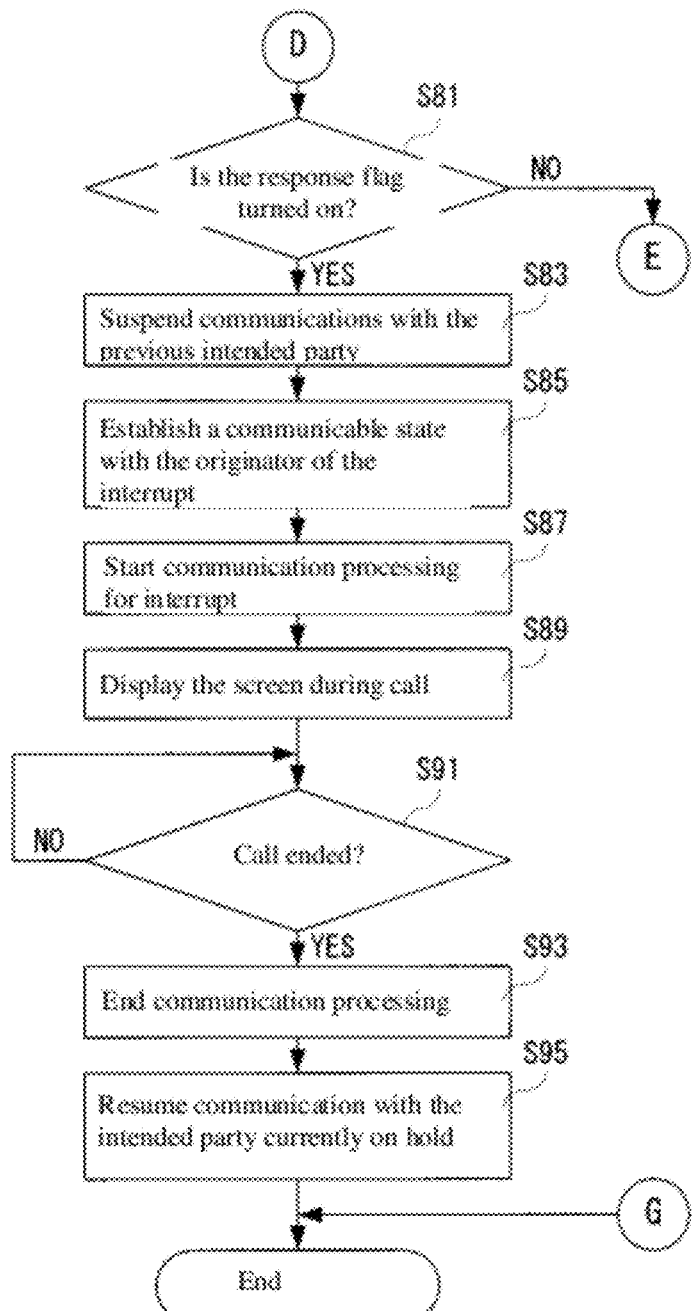
FIG. 19 is a flow diagram showing another part of the interrupt processing of the processor.

At the subsequent Step S103, it determines whether or not to end the voice-mail recording. That is, the processor 24 determines whether or not the telephone of the originator of the incoming call interrupt disconnected the communication. If it is "NO" at Step S103, that is, if the voice-mail recording is not completed, it returns to the same Step S87, and continues voice-mail recording. In contrast, if it is "YES" at Step S103, that is, if it ends voice-mail recording, at Step S105, it disconnects the communication and, as shown in FIG. 19, ends interrupt processing. After voice-mail recording is completed, the received audio signals (the audio signals of the message) temporarily stored in the RAM 34 are stored in the flash memory 32.

If it is "NO" at Step S97, at Step S107, it establishes a communicable state with the telephone of the originator of the incoming call interrupt and, at Step S109, starts voice-mail recording. At Step S111, it determines whether or not to end voice-mail recording. If it is "NO" at Step S111, it returns to the same Step S111 and continues voice-mail recording. In contrast, if it is "YES" at Step S111, at Step S113, it disconnects communication with the originator of the incoming call interrupt, and at Step S115, the message composition screen 90 as shown in FIG. 13 (B) is displayed on the display 30.

At the subsequent Step S117, a message is composed, in accordance with the operation by the user. At Step S119, it is determined whether or not message composition is completed. If it is "NO" at Step S119, it returns to Step S117 and continues composing the message. In contrast, if it is "YES" at Step S119, at Step S121, it transmits the composed message to the originator and ends interrupt processing.

According to the present embodiment, if correspondence with respect to the incoming call is selected on the correspondence selection screen, the execution screen is displayed, and the operation for performing the selected correspondence is performed; thereby preventing operational errors compared to cases in which correspondence with respect to the incoming call is selected and performed with one touch.

In the present embodiment, if sliding is not performed more than the predefined distance on the execution screen, so as to move the object image, the correspondence selected on the correspondence selection screen will not be performed; consequently, even if correspondence is mistakenly selected when the mobile phone is removed from a bag or a case, it can be prevented from being performed as is, at a somewhat high percentage.

The mobile phone 10 according to another embodiment is the same as the above embodiment, with the exception of a few differences in the operation methods on the correspondence selection screen, the execution screen, and the execution screen; therefore, a duplicated explanation is omitted. The correspondence selection screen as well as the execution screen and the operation method thereof are respectively described below; however, the explanation will be brief because the content is the same as described in the above embodiment.

As shown in FIG. 21 (A), a correspondence selection screen 120 according to another embodiment comprises a display area 120a and a display area 120b. As above, information such as the radio field intensity is displayed on the display area 120a. Originator information 1200 is displayed on the display area 120b and an object image 1202 is displayed on the rear surface. Regarding the object image 1202, a button image 1202a is displayed on the lower edge, a button image 1202b is displayed on the left edge, and a button image 1202c is displayed on the right edge. The originator information 1200 is as described in the above embodiment.

The object image 1202 is, for example, an image in which a seal, a piece of paper, or a piece of cloth is imitated, and is indicated, for example, in white color on this correspondence selection screen 120. The button image 1202a is provided in order for answering the incoming call to be selected. The button image 1202b is provided in order for ignoring the incoming call to be selected. The button image 1202c is provided in order for ignoring the incoming call while simultaneously transmitting a message to be selected. Though difficult to understand from the figures, a predefined color, which is different for each, is applied to each of the button images 1202a to 1202c, and at the same time, an image or a graphic symbol showing the allocated correspondence is displayed.

Note that in FIG. 21 (A), each different color respectively applied to each of the button images 1202a to 1202c is shaded, diagonal, and has dotted patterns so as to be identifiable. In order to indicate the correspondence allocated to each of the button images 1202a to 1202c, an image imitating a telephone receiver and an image imitating mail (envelope) are indicated.

As is the case with the above embodiment, the detection range of the touch panel 38 is set corresponding to each operation area of the button images 1202a to 1202c. Therefore, if the coordinate data is input from the touch panel 38, it is determined whether or not this coordinate data is within the detection range corresponding to the operation area of the button images 1202a to 1202c. If any one of the button images 1202a to 1202c is touched, the execution screen is displayed. For example, for the correspondence selection screen 120 shown in FIG. 21 (A), if the button image 1202b is touched, an execution screen 130 shown in FIG. 21 (B) is displayed on the display 30. That is, the execution screen 130 for cases in which the incoming call is ignored is displayed. The execution screen 130 shown in FIG. 21 (B) is comprised of a display area 130*a* and a display area 130*b*. As above, information such as the radio field intensity is displayed on the display area 130*a*.

Originator information 1300 is displayed on the display area 130*b* and an object image 1302 is displayed on the rear surface. This object image 1302 is the image in which the object image 1202 displayed on the correspondence selection screen 120 changes. Specifically, the object image 1302 is in a state in which the left edge is rolled up and displayed by applying the predefined color. That is, in response to the button image 1202*b* being touched on the correspondence selection screen 120, the object image 1302 reaches a state in which the left edge part displaying the button image 1202*b* is rolled up, and the same color as the color applied to the button image 1202*b* is applied on the surface.

Note that in the figures, by applying the same pattern as the pattern applied to the button image 1202*b* to the object image 1302, it indicates that the same color is applied. The same applies to the execution screen 130 for cases in which other button images 1202*a* and 1202*c* are touched.

If the button image 1202*a* is touched on the correspondence selection screen 120 shown in FIG. 21 (A), as shown in FIG. 22 (A), the execution screen 130 is displayed on the execution screen 130 for cases in which answering the incoming call is selected. The execution screen 130 shown in FIG. 22 (A) is the same as the execution screen 130 shown in FIG. 21 (B), except that the object image 1302 is different; therefore, a duplicated explanation is omitted.

As shown in FIG. 22 (A), for the object image 1302, the bottom edge part displaying the button image 1202*a* is rolled up, and the same color as the color applied to the button image 1202*a* is applied on the surface.

In another embodiment, the index image (704) as shown in the above embodiment is not displayed on the execution screen 130; however, because it is displayed in the state in which either edge of the object image 1302 is rolled up, the act of turning the object image 1302 (peeling action) is facilitated.

Note that though not shown in the figures, for an animation image in which a softly waving object image 1302 is displayed, the turning action can be effectively facilitated.

For example, initially, when the execution screen 130 is displayed, the operation area is only set as a winding part 1302*a* within the object image 1302, and the detection range is set to the touch panel 38 corresponding to this operation area.

In the present other embodiment, if the winding part 1302*a* within the object image 1302 is touched in the release state, and if it is slid in the predefined direction for more than the predefined distance (for example, dozens of pixels) while being touched, it is possible to command the performing of the correspondence selected on the correspondence selection screen 120.

Specifically, for cases in which the winding part 1302*a* is touched and sliding is performed upwards on the execution screen 130 shown in FIG. 22 (A), as shown in FIG. 22 (B), if the object image 1302 is wound up in accordance with the slide and it slides for the predefined distance, as shown in FIG. 22 (C), the entire object image 1302 is wound up (wound up). That is, the object image 1302 is turned over. Accordingly, a command is provided to perform the correspondence selected on the correspondence selection screen 120.

Note that if the value of the Y coordinate indicated by the coordinate data input from the touch panel 38 increases, it can be determined that it is sliding upwards.

However, the slide distance is as described above; therefore, a duplicated explanation is omitted. Hereinafter, the same applies to another embodiment.

On the execution screen 130 shown in FIG. 21 (B), if the winding part 1302*a* is touched in the release state and sliding is performed rightwards while being touched, the object image 1302 is wound up, and if slid by the predefined distance, the entire object image 1302 is wound up.

Note that if the value of the X coordinate indicated by the coordinate data input from the touch panel 38 increases, it can be determined that it is sliding rightwards.

However, as is the case with the above embodiment, if parts other than the winding part 1302*a* of the object image 1302 are touched in the release state, even if sliding is performed in the predefined direction for more than the predefined distance, the command to perform the correspondence selected on the correspondence selection screen 120 is not given.

If it is released without sliding for more than the predefined distance, the object image 1302 is returned to the original state. That is, the execution screen 130 is returned to the initial state that was displayed.

On the correspondence selection screen 120, if the button image 1202*c* is touched and if ignoring the incoming call while simultaneously transmitting a message is selected, for the object image 1302, the right edge part displaying the button image 1202*c* is wound up, and the same color as the color applied to the button image 1202*c* is applied on the surface. If the command to perform the correspondence selected on the correspondence selection screen 120 is given, the winding part 1302*a* of the object image 1302 is touched and, while being touched, it is slid leftwards for more than the predefined distance. In this case, if the X coordinate input indicated by the coordinate data from the touch panel 38 decreases, it is determined that it is sliding leftwards.

Note that in another embodiment, once the command to perform the correspondence selected on the correspondence selection screen 120 is given, it is constituted so as to perform the slide in the predefined direction that is different from each other, according to the correspondence; however, if sliding is performed for more than the predefined distance, the slide direction is not particularly limited. For example, for the execution screen 130 shown in FIG. 21 (B), it may not only slide rightwards but also diagonally to the right and vertically. For the execution screen 130 shown in FIG. 22 (A), it may not only slide vertically but also horizontally or diagonally.

Another embodiment is constituted so as to slide longer than the predefined distance; however, as is the case with the above embodiment, in response to the winding part 1302*a* being touched, it may be determined that the command to perform the correspondence selected on the correspondence selection screen 120 is given.

In another embodiment, for the determination processing at Step S21 and Step S79 shown in FIG. 15, depending on whether or not either one of the button images 1202*a* to 1202*c* on the correspondence selection screen 120 is touched, the same applies as the above embodiment, except that the predefined sliding direction differs; therefore, processing of the processor 24 is also omitted.

Understandably, in another embodiment, at Step S5 or Step S63, the correspondence selection screen 120 shown in FIG. 21 (A) is displayed on the display 30, and at Step S19 or Step S77, the execution screen 130 shown in FIG. 21 (B) or FIG. 22 (A) is displayed on the display 30. In response to a touch or a slide by the user, the execution screen 130 is displayed showing the state in which the object image 1302 is wound up (turned over).

In another embodiment, similarly to the above embodiment, it is also possible to correspond to an incoming call, resulting from an unintentional operation by the user.

Note that in the above embodiment, for the execution screen, if the object image or some parts of the object image are touched in the released sate and slid in the predefined direction for more than the predefined distance while being touched, the correspondence with respect to the incoming call selected on the correspondence selection screen is performed; however, it is not limited to this. For example, on the execution screen, if the object image or some parts of the object image are flicked in the released sate, the object image is moved according to this flick, or the object image is wound up, and correspondence with respect to the incoming call selected on the correspondence selection screen may be performed. In such cases, the sliding direction for the flick may be in any direction. However, if the strength of the flick (the speed of the slide) is below the predefined value (for example, 0.5 pixel/ms), there is a possibility of operational errors; therefore, even if it is flicked, the selected correspondence will not be performed. In such cases, for example, after the message indicating to strengthen the flick (increasing the speed of the slide) is displayed on the display, it may return to the correspondence selection screen.

The above embodiment is constituted such that if a button image is touched on the correspondence selection screen, the execution screen displaying the object image according to the button image is displayed; however, it is not limited to this. For example, if a button image is touched, the execution screen on which button images other than the button image are displayed in dark color (grayed out) or hidden (erased), may be displayed. By moving the touched button image in the predefined direction for more than the predefined distance by sliding or by flicking it at a strength (speed) greater than the predefined value, correspondence with respect to the incoming call may be performed.

In the above embodiment, it was selected to answer, ignore, and ignore while simultaneously transmitting the message, with respect to the incoming call; however, ignoring, or ignoring while simultaneously transmitting the message may not have to be selected (may not exist). That is, it may be constituted such that in response to the incoming call, it is possible for answering or ignoring to be selected, or it may be constituted such that it is possible for ignoring while simultaneously transmitting the message to be selected.

The above embodiment is constituted such that the display of each screen is displayed in Japanese; however, it is not limited to this. For example, it may be displayed in other languages such as English, French, German, Russia, Korean, and Chinese. It may also be constituted such that it is possible to select the language that the user displays.

In the above embodiment, as shown in FIG. 11 (B), by displaying the index image in which V-shaped letters of varying size are vertically disposed, the object image is displayed moving; however, it may display a message indicating that the object image moves downwards. In this case, the message may be displayed in Japanese or in another language described above.

The index image shown in FIG. 11 (B) according to the above embodiment is one example and is not limited to this. For example, an index image in which two or more triangles vertically disposed in the reverse direction may be displayed, or an index image in which more than one or two downwards arrows are vertically disposed may also be displayed.

In the above embodiment, the CDMA method is used as the communication method; however, it is not limited to this, with other methods such as the LTE (Long Term Evolution) method, the W-CDMA method, the GSM method, the TDMA method, the FDMA method, and the PHS method, also possibly being used.

In the above embodiment, an explanation was provided only for cases in which when answering the incoming call is selected and call processing is performed, interrupt processing is performed; however, the same interrupt processing is also performed for cases in which call processing is performed with another telephone, in response to the transmission.

Any specific numerical values, such as the predefined distance, predefined time, predefined number of times, and predefined value, as mentioned above, are listed herein as mere examples but are appropriately changeable according to the specifications of a product, etc.

For example, the layout of the soft keys 100 displayed on the display area 90$d$ of the message composition screen shown in FIG. 13 (B) may be in the QWERTY layout.

While at least one exemplary embodiment is presented in the foregoing detailed description, the present disclosure is not limited to the above-described embodiment or embodiments. Variations may be apparent to those skilled in the art. In carrying out the present disclosure, various modifications, combinations, sub-combinations and alterations may occur in regard to the elements of the above-described embodiment insofar as they are within the technical scope of the present disclosure or the equivalents thereof. The exemplary embodiment or exemplary embodiments are examples, and are not intended to limit the scope, applicability, or configuration of the disclosure in any way. Rather, the foregoing detailed description will provide those skilled in the art with a template for implementing the exemplary embodiment or exemplary embodiments. It should be understood that various changes can be made in the function and arrangement of elements without departing from the scope of the disclosure as set forth in the appended claims and the legal equivalents thereof. Furthermore, although embodiments of the present disclosure have been described with reference to the accompanying drawings, it is to be noted that changes and modifications may be apparent to those skilled in the art. Such changes and modifications are to be understood as being comprised within the scope of the present disclosure as defined by the claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the present disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A mobile phone comprising:
   a touch panel;
   a correspondence execution determination part that determines whether or not to correspond with respect to an incoming call from another telephone, in response to a first input from said touch panel;
   a correspondence selection part that, when said correspondence execution determination part determines to correspond with respect to the incoming call from said other telephone, in response to a second input from said touch panel, selects to at least answer said incoming call or ignore said incoming call;
   a first display part that, if there is an incoming call from said other telephone, displays a correspondence execution selection screen for instructing whether or not to correspond with respect to the incoming call;
   a second display part that, on the correspondence execution selection screen displayed by said first display part, when it is selected to correspond with respect to said incoming call, in response to the first input from said touch panel, displays a correspondence content selection screen for selecting to answer said incoming call or ignore said incoming call; and
   a storage part that stores a detection range of said touch panel corresponding to a set operation area, corresponding to some area of said correspondence execution selection screen, wherein said correspondence execution determination part, when said correspondence execution selection screen is displayed by said first display part, if the first input from said touch panel is within the detection range stored in said storage part, determines to correspond with respect to said incoming call.

2. The mobile phone according to claim 1, wherein:
   the second display part displays the correspondence content selection screen for selecting to answer the incoming call, ignore the incoming call, or ignore the incoming call and transmit a message to the originator of the incoming call, and
   the correspondence selection part, on the correspondence content selection screen displayed by the second display part, selects to answer the incoming call, ignore the incoming call, or ignore the incoming call and transmit a message to the originator of the incoming call, in response to the second input from the touch panel.

3. A mobile phone according to claim 1, wherein the correspondence selection part transmits a message to said other telephone after selecting to at least answer said incoming call or ignore said incoming call.

4. A mobile phone comprising:
   a touch panel;
   a correspondence selection part that selects to correspond with respect to an incoming call from another telephone, in response to a first input from said touch panel;
   an execution part that performs the correspondence selected by said correspondence selection part, in response to a second input from said touch panel, wherein the mobile phone is in an unlocked state such that it can perform one or more processes initiated by a user immediately prior to detecting the incoming call;
   a first display part that, if there is an incoming call from said other telephone, displays a correspondence execution selection screen for instructing whether or not to correspond with respect to the incoming call;
   a second display part that, on the correspondence execution selection screen displayed by said first display part, when it is selected to correspond with respect to said incoming call, in response to the first input from said touch panel, displays a correspondence content selection screen for selecting to answer said incoming call or ignore said incoming call; and
   a storage part that stores a detection range of said touch panel corresponding to a set operation area, corresponding to some area of said correspondence execution selection screen, wherein said correspondence execution determination part, when said correspondence execution selection screen is displayed by said first display part, if the first input from said touch panel is within the detection range stored in said storage part, determines to correspond with respect to said incoming call.

5. The mobile phone according to claim 4, further comprising:
   a determination part that, on the correspondence content selection screen displayed by said second display part, in response to the second input from said touch panel, determines whether or not a predefined operation is performed,
   wherein said execution part, when said determination part determines that said predefined operation is performed, performs the correspondence selected by said correspondence selection part.

6. The mobile phone according to claim 5, wherein said predefined operation comprises an operation in which an amount of touch point movement detected according to the second input from the touch panel is greater than a predefined value.

7. The mobile phone according to claim 6, wherein said predefined operation further comprises an operation in which a direction of said touch point movement is in a predefined direction.

8. The mobile phone according to claim 4, wherein the correspondence with respect to the incoming call from said other telephone includes answering the incoming call or ignoring the incoming call.

9. The mobile phone according to claim 8, wherein the correspondence with respect to the incoming call from said other telephone further includes ignoring the incoming call and transmitting a message to the originator of the incoming call.

10. The mobile phone according to claim 5, wherein the correspondence with respect to the incoming call from said other telephone includes answering the incoming call or ignoring the incoming call.

11. The mobile phone according to claim 10, wherein the correspondence with respect to the incoming call from said other telephone includes ignoring the incoming call and transmitting a message to the originator of the incoming call.

12. The mobile phone according to claim 6, wherein the correspondence with respect to the incoming call from said other telephone includes answering the incoming call or ignoring the incoming call.

13. The mobile phone according to claim 12, wherein the correspondence with respect to the incoming call from said other telephone further includes ignoring the incoming call and transmitting a message to the originator of the incoming call.

14. The mobile phone according to claim 7, wherein the correspondence with respect to the incoming call from said other telephone includes answering the incoming call or ignoring the incoming call.

15. The mobile phone according to claim 14, wherein the correspondence with respect to the incoming call from said other telephone further includes ignoring the incoming call and transmitting a message to the originator of the incoming call.

\* \* \* \* \*